(12) United States Patent
Fujishiro et al.

(10) Patent No.: US 11,997,672 B2
(45) Date of Patent: May 28, 2024

(54) COMMUNICATION CONTROL METHOD

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 355 days.

(21) Appl. No.: 17/401,267

(22) Filed: Aug. 12, 2021

(65) Prior Publication Data

US 2021/0377980 A1 Dec. 2, 2021

Related U.S. Application Data

(63) Continuation of application No. PCT/JP2020/005395, filed on Feb. 12, 2020.

(60) Provisional application No. 62/805,435, filed on Feb. 14, 2019.

(51) Int. Cl.
*H04W 72/1268* (2023.01)
*H04W 36/08* (2009.01)
*H04W 72/21* (2023.01)
*H04W 88/14* (2009.01)

(52) U.S. Cl.
CPC ....... *H04W 72/1268* (2013.01); *H04W 36/08* (2013.01); *H04W 72/21* (2023.01); *H04W 88/14* (2013.01)

(58) Field of Classification Search
CPC . H04W 72/1268; H04W 36/08; H04W 72/21; H04W 88/14; H04W 36/0009; H04W 84/047; H04W 28/12; H04W 40/22; H04B 7/15542
See application file for complete search history.

(56) References Cited

U.S. PATENT DOCUMENTS

2017/0041063 A1\* 2/2017 Speight ............. H04B 7/15507
2018/0324865 A1 11/2018 Hui et al.
2020/0037200 A1\* 1/2020 Cho ...................... H04W 72/23

OTHER PUBLICATIONS

Sequans Communications, Flow control for PDCP operation, 3GPP TSG-RAN WG2 Meeting #103, Gothenburg, Sweden, Aug. 20-24, 2018, R2-1812865 (Year: 2018).\*

(Continued)

*Primary Examiner* — Shailendra Kumar
(74) *Attorney, Agent, or Firm* — Studebaker & Brackett PC

(57) ABSTRACT

A communication control method includes: receiving, by a relay apparatus, a first scheduling request of requesting allocation of an uplink radio resource to a lower apparatus from the lower apparatus; and after the relay apparatus receives the first scheduling request from the lower apparatus, transmitting, by the relay apparatus, a second scheduling request of requesting allocation of uplink radio resource to the relay apparatus to an upper apparatus before receiving the uplink data from the lower apparatus.

6 Claims, 23 Drawing Sheets

Option 2: UL grant is considered as data available for transmission

(56) References Cited

OTHER PUBLICATIONS

Sequans Communication, "Flow control for PDCP operation", 3GPP TSG-RAN WG2 Meeting #103; R2-1812865; Aug. 20-24, 2018; pp. 1-6; Gothenburg, Sweden.
Qualcomm Incorporated (Rapporteur), "U-plane aspects of architecture group 1", 3GPP TSG-RAN WG2 Meeting #102; R2-1809142; Apr. 21-25, 2018; pp. 1-9; Busan, South Korea.
Intel Corporation, "Uplink Latency in IAB networks", 3GPP TSG RAN WG2 Meeting #104; R2-1817700; Nov. 12-16, 2018; pp. 1-6; Spokane, U.S.A.
Ericsson, "Uplink Scheduling in IAB Networks", 3GPP TSG-RAN WG2 Meeting #103b; R2-1814365; Oct. 8-12, 2018; pp. 1-7; Chengdu, P.R. China.

* cited by examiner

| IAB NODE | DONOR CANDIDATE 1 | DONOR CANDIDATE 2 | DONOR CANDIDATE 3 | DONOR CANDIDATE 4 |
| --- | --- | --- | --- | --- |
| IAB NODE #1 | gNB#1 | gNB#2 | gNB#3 | – |
| IAB NODE #2 | gNB#1 | gNB#3 | – | – |
| IAB NODE #3 | gNB#1 | gNB#4 | gNB#5 | gNB#6 |

FIG. 7

COMMUNICATION CONTROL METHOD

RELATED APPLICATIONS

The present application is a continuation based on PCT Application No. PCT/JP2020/005395, filed on Feb. 12, 2020, which claims the benefit of US Provisional Patent Application No. 62/805,435 filed on Feb. 14, 2019. The content of which is incorporated by reference herein in their entirety.

TECHNICAL FIELD

The present disclosure relates to a communication control method used in a mobile communication system.

BACKGROUND ART

In the 3rd Generation Partnership Project (3GPP), which is a standardization project of a mobile communication system, a new relay apparatus referred to as an Integrated Access and Backhaul (IAB) node has been under study. One or a plurality of relay apparatuses are involved in communication between a base station and user equipment, and perform relay for the communication. The relay apparatus includes a user equipment function and a base station function, and performs radio communication with an upper node (the base station or an upper relay apparatus) by using the user equipment function and performs radio communication with a lower node (the user equipment or a lower relay apparatus) by using the base station function.

A radio section between the user equipment and the relay apparatus or the base station may be referred to as an access link. A radio section between the relay apparatus and the base station or another relay apparatus may be referred to as a backhaul link. The 3GPP Contribution "RP-170217" describes a method of dynamically switching data transfer paths by integrating and multiplexing data communication in the access link and data communication in the backhaul link in Layer 2 and dynamically allocating radio resources to the backhaul link.

SUMMARY OF INVENTION

A communication control method according to an embodiment is a method using a relay apparatus configured to relay uplink data transmitted from user equipment to a donor base station in a mobile communication system. The communication control method includes: transmitting, by a Radio Link Control (RLC) entity of the relay apparatus, the uplink data to another relay apparatus being interposed between the relay apparatus and the donor base station; receiving, by an upper entity, transmission acknowledgment information corresponding to the uplink data from the donor base station via another relay apparatus, the upper entity being an entity of the relay apparatus and being higher than the RLC entity; and reporting, by the upper entity, information related to the transmission acknowledgment information received from the donor base station to the RLC entity.

BRIEF DESCRIPTION OF DRAWINGS

FIG. 7 is a diagram illustrating an example of a table for determining a context transfer destination according to the first embodiment.

DESCRIPTION OF EMBODIMENTS

A mobile communication system according to an embodiment will be described with reference to the drawings. In the following description regarding the drawings, the same or similar parts are denoted by the same or similar reference signs.

First Embodiment

Configuration of Mobile Communication System

Figure 1:
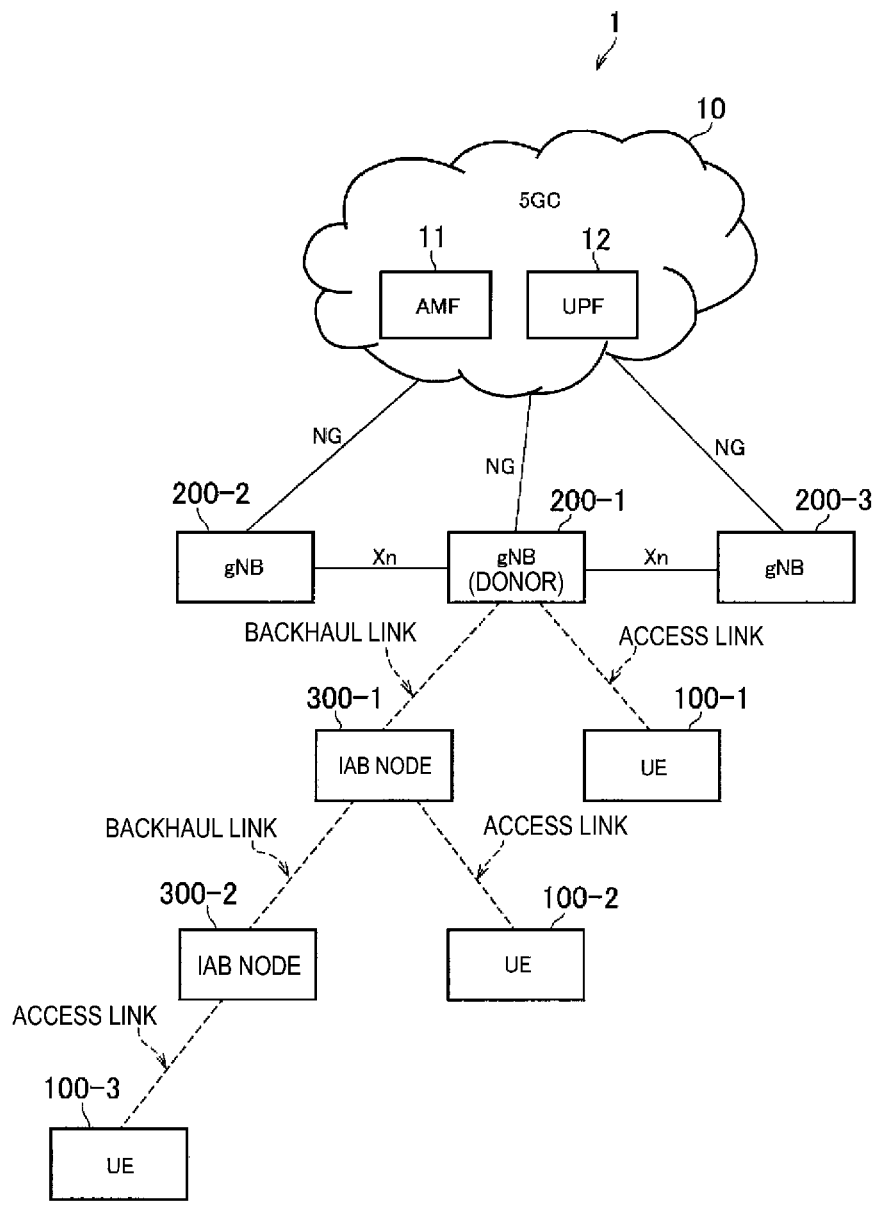
FIG. 1 is a diagram illustrating a configuration of a mobile communication system according to an embodiment.

A configuration of a mobile communication system according to the present embodiment will be described. FIG. 1 is a diagram illustrating a configuration of a mobile communication system 1 according to the present embodiment. The mobile communication system 1 is a fifth generation (5G) mobile communication system based on the 3GPP standard. Specifically, a radio access scheme in the mobile communication system 1 is New Radio (NR) being a radio access scheme of 5G. Note that Long Term Evolution (LTE) may be at least partially applied to the mobile communication system 1.

As illustrated in FIG. 1, the mobile communication system 1 includes a 5G core network (5GC) 10, user equipment (UE) 100, a base station (referred to as a gNB) 200, and an IAB node 300. The present embodiment mainly describes an example in which the base station is an NR base station. However, the base station may be an LTE base station (specifically, an eNB).

The 5GC 10 includes an Access and Mobility Management Function (AMF) 11 and a User Plane Function (UPF) 12. The AMF 11 is an apparatus that performs various types of mobility control and the like for the UE 100. By communicating with the UE 100 by using Non-Access Stratum (NAS) signaling, the AMF 11 manages information of an area in which the UE 100 exists. The UPF 12 is an apparatus that performs transfer control of user data and the like.

The gNB 200 is connected to the 5GC 10 via an interface referred to as an NG interface. FIG. 1 illustrates an example of three gNB 200-1 to gNB 200-3 that are connected to the 5GC 10. The gNB 200 is a fixed radio communication apparatus that performs radio communication with the UE 100. When the gNB 200 has a donor function, the gNB 200 may perform radio communication with the IAB node that is connected to the gNB 200 by radio.

The gNB 200 is connected to another neighboring gNB 200 via an inter-base station interface referred to as an Xn interface. FIG. 1 illustrates an example in which the gNB 200-1 is connected to the gNB 200-2 and the gNB 200-3.

Each gNB 200 manages one or a plurality of cells. The cell is used as a term denoting a minimum unit of a radio communication area. The cell may be used as a term denoting a function or a resource for performing radio communication with the UE 100. One cell belongs to one carrier frequency.

The UE 100 is a mobile radio communication apparatus that can perform radio communication with the gNB 200. The UE 100 may perform radio communication with the IAB node 300. The UE 100 may be any type of apparatus as long as the UE 100 is an apparatus that performs radio communication with the gNB 200 or the IAB node 300. For example, the UE 100 is a mobile phone terminal, a tablet terminal, a laptop PC, a sensor, an apparatus that is provided in a sensor, a vehicle, or an apparatus that is provided in a vehicle.

FIG. 1 illustrates an example in which UE 100-1 is connected to the gNB 200-1 by radio, UE 100-2 is connected to an IAB node 300-1 by radio, and UE 100-3 is connected to an IAB node 300-2 by radio. The UE 100-1 directly performs communication with the gNB 200-1. The UE 100-2 indirectly performs communication with the gNB 200-1 via the IAB node 300-1. The UE 100-3 indirectly performs communication with the gNB 200-1 via the IAB node 300-1 and the IAB node 300-2.

The IAB node 300 is an apparatus (relay apparatus) that is involved in communication between the eNB 200 and the UE 100, and performs relay for the communication. FIG. 1 illustrates an example in which the IAB node 300-1 is connected to the gNB 200-1 being a donor by radio, and the IAB node 300-2 is connected to the IAB node 300-1 by radio. Each IAB node 300 manages a cell. A cell ID of the cell managed by the IAB node 300 may be the same as or different from a cell ID of the cell of the donor gNB 200-1.

The IAB node 300 has a UE function (user equipment function) and a gNB function (base station function). The IAB node 300 performs radio communication with an upper node (the gNB 200 or an upper IAB node 300) by using the UE function, and performs radio communication with a lower node (the UE 100 or a lower IAB node 300) by using the gNB function. Note that the UE function refers to at least a part of the functions of the UE 100, and the IAB node 300 need not necessarily have all of the functions of the UE 100. The gNB function refers to at least a part of the functions of the gNB 200, and the IAB node 300 need not necessarily have all of the functions of the gNB 200.

A radio section between the UE 100 and the IAB node 300 or the gNB 200 may be referred to as an access link (or, Uu). A radio section between the IAB node 300 and the gNB 200 or another IAB node 300 may be referred to as a backhaul link (or, Un). The backhaul link may be referred to as a fronthaul link.

Data communication in the access link and data communication in the backhaul link can be integrated and multiplexed in Layer 2, radio resources can be dynamically allocated to the data communication in the backhaul link, and paths of relay can be dynamically switched. Note that, for the access link and the backhaul link, millimeter wave bands may be used. The access link and the backhaul link may be multiplexed by means of time division multiplexing and/or frequency division multiplexing.

Configuration of gNB

Figure 2:
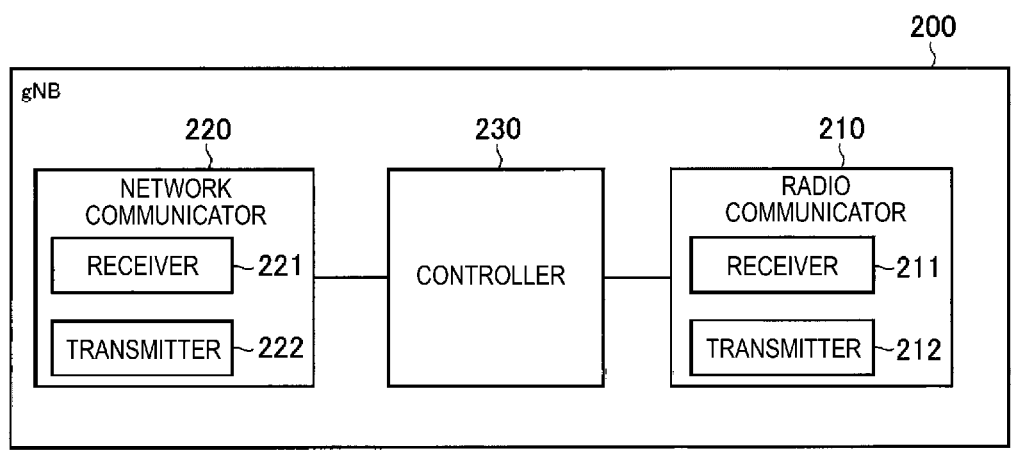
FIG. 2 is a diagram illustrating a configuration of a base station (gNB) according to the embodiment.

A configuration of the gNB 200 according to the present embodiment will be described. FIG. 2 is a diagram illustrating a configuration of the gNB 200. As illustrated in FIG. 2, the gNB 200 includes a radio communicator 210, a network communicator 220, and a controller 230.

The radio communicator 210 is used for radio communication with the UE 100 and radio communication with the IAB node 300. The radio communicator 210 includes a receiver 211 and a transmitter 212. The receiver 211 performs various types of reception while being controlled by the controller 230. The receiver 211 includes an antenna, and converts a radio signal received by the antenna into a baseband signal (received signal) and outputs the baseband signal to the controller 230. The transmitter 212 performs various types of transmission while being controlled by the controller 230. The transmitter 212 includes an antenna, and converts a baseband signal (transmission signal) to be output by the controller 230 into a radio signal and transmits the radio signal from the antenna.

The network communicator 220 is used for wired communication (or radio communication) with the 5GC 10 and wired communication (or radio communication) with another neighboring gNB 200. The network communicator 220 includes a receiver 221 and a transmitter 222. The receiver 221 performs various types of reception while being controlled by the controller 230. The receiver 221 receives a signal from the outside and outputs the received signal to the controller 230. The transmitter 222 performs various types of transmission while being controlled by the controller 230. The transmitter 222 transmits a transmission signal output by the controller 230 to the outside.

The controller 230 performs various types of control in the gNB 200. The controller 230 includes at least one processor and at least one memory. The memory stores a program to be executed by the processor, and information to be used for processing performed by the processor. The processor may include a baseband processor and a Central Processing Unit (CPU). The baseband processor performs, for example, modulation, demodulation and coding and decoding of the baseband signal. The CPU performs various types of processing by executing the program stored in the memory. The processor executes processing to be described later.

Configuration of IAB Node

Figure 3:
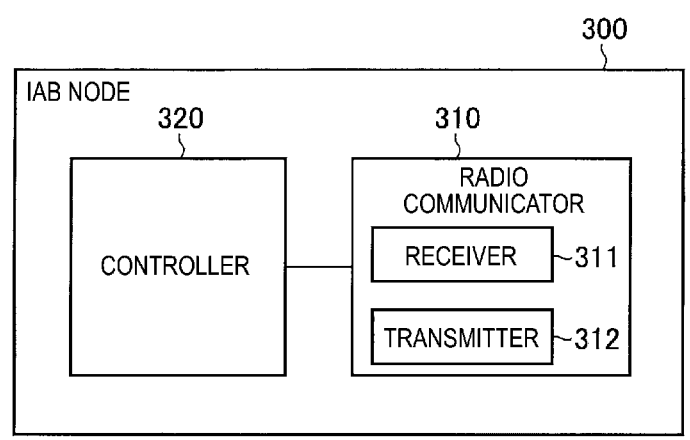
FIG. 3 is a diagram illustrating a configuration of a relay apparatus (IAB node) according to the embodiment.

A configuration of the IAB node 300 according to the present embodiment will be described. FIG. 3 is a diagram illustrating a configuration of the IAB node 300. As illustrated in FIG. 3, the IAB node 300 includes a radio communicator 310 and a controller 320.

The radio communicator 310 is used for radio communication (backhaul link) with the gNB 200 and radio communication (access link) with the UE 100. The radio communicator 310 includes a receiver 311 and a transmitter 312. The receiver 311 performs various types of reception while being controlled by the controller 320. The receiver 311 includes an antenna, and converts a radio signal received by the antenna into a baseband signal (received signal) and outputs the baseband signal to the controller 320. The transmitter 312 performs various types of transmission while being controlled by the controller 320. The transmitter 312 includes an antenna, and converts a baseband signal (transmission signal) to be output by the controller 320 into a radio signal and transmits the radio signal from the antenna.

The controller 320 performs various types of control in the IAB node 300. The controller 320 includes at least one processor and at least one memory. The memory stores a program to be executed by the processor, and information to be used for processing performed by the processor. The processor may include a baseband processor and a CPU. The baseband processor performs, for example, modulation, demodulation and coding and decoding of the baseband signal. The CPU performs various types of processing by executing the program stored in the memory. The processor executes processing to be described later.

Configuration of UE

Figure 4:
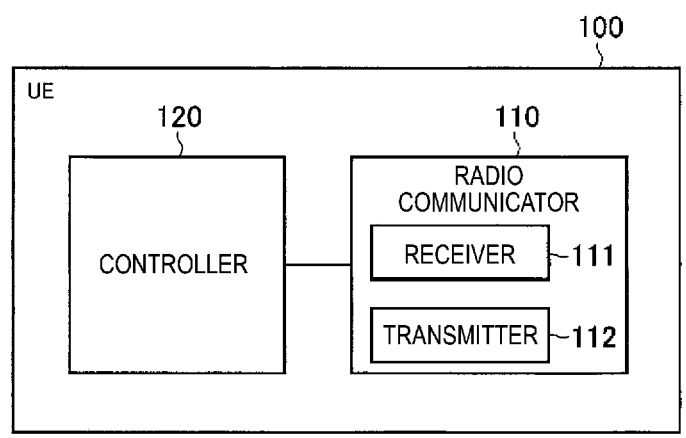
FIG. 4 is a diagram illustrating a configuration of user equipment (UE) according to the embodiment.

A configuration of the UE 100 according to the present embodiment will be described. FIG. 4 is a diagram illustrating a configuration of the UE 100. As illustrated in FIG. 4, the UE 100 includes a radio communicator 110 and a controller 120.

The radio communicator 110 is used for radio communication in the access link, specifically, radio communication with the gNB 200 and radio communication with the IAB node 300. The radio communicator 110 includes a receiver 111 and a transmitter 112. The receiver 111 performs various types of reception while being controlled by the controller 120. The receiver 111 includes an antenna, and converts a radio signal received by the antenna into a baseband signal (received signal) and outputs the baseband signal to the controller 120. The transmitter 112 performs various types of transmission while being controlled by the controller 120. The transmitter 112 includes an antenna, and converts a baseband signal (transmission signal) to be output by the controller 120 into a radio signal and transmits the radio signal from the antenna.

The controller 120 performs various types of control in the UE 100. The controller 120 includes at least one processor and at least one memory. The memory stores a program to be executed by the processor, and information to be used for processing performed by the processor. The processor may include a baseband processor and a CPU. The baseband processor performs, for example, modulation, demodulation and coding and decoding of the baseband signal. The CPU performs various types of processing by executing the program stored in the memory. The processor executes processing to be described later.

Example of Protocol Stack Configuration

Figure 5:
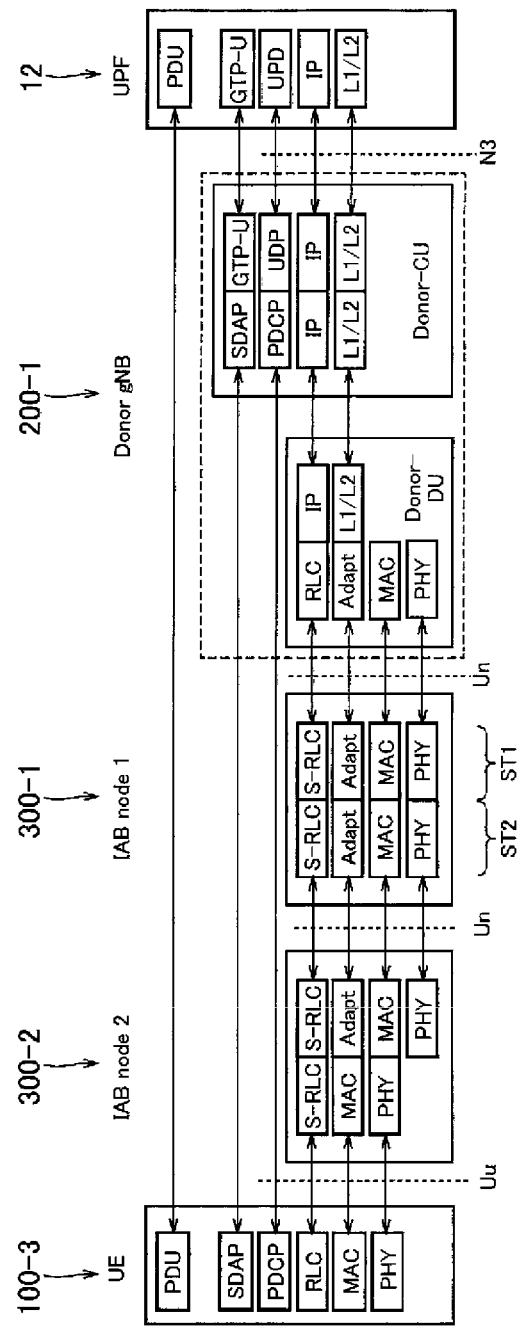
FIG. 5 is a diagram illustrating an example of a protocol stack configuration of a user plane in the mobile communication system according to the embodiment.

An example of a protocol stack configuration in the mobile communication system 1 according to the present embodiment will be described. FIG. 5 is a diagram illustrating an example of a protocol stack configuration of the user plane. Here, an example of a protocol stack configuration related to user data transmission between the UE 100-3 and the UPF 12 of the 5GC 10 illustrated in FIG. 1 will be described.

As illustrated in FIG. 5, the UPF 12 includes a GPRS Tunneling Protocol for User Plane (GTP-U), a User Datagram Protocol (UDP), an Internet Protocol (IP), and a Layer 1/Layer 2 (L1/L2). The gNB 200-1 (donor gNB) is provided with a protocol stack corresponding to these.

The gNB 200-1 includes a central unit (CU) and a distributed unit (DU). Of the protocol stack of the radio interface, the CU includes layers at and higher than a Packet Data Convergence Protocol (PDCP), the DU includes layers at and lower than a Radio Link Control (RLC), and the CU and the DU are connected via an interface referred to as an F1 interface.

Specifically, the CU includes a Service Data Adaptation Protocol (SDAP), a PDCP, an IP, and an L1/L2. The SDAP and the PDCP of the CU perform communication with the SDAP and the PDCP of the UE 100 via the DU, the IAB node 300-1, and the IAB node 300-2.

Of the protocol stack of the radio interface, the DU includes an RLC, an adaptation layer (Adapt), a Medium Access Control (MAC), and a Physical layer (PHY). These protocol stacks are protocol stacks for the gNB. Note that the upper/lower relationship between the adaptation layer and the RLC (S-RLC) may be inverted.

In the IAB node 300-1, a protocol stack ST1 for the UE corresponding to these is provided. In addition, in the IAB node 300-1, a protocol stack ST2 for the gNB is provided. Each of the protocol stack ST1 and the protocol stack ST2 includes layers (sub-layers) at or lower than Layer 2. Specifically, the IAB node 300-1 is a Layer 2 relay apparatus that performs relay of user data by using the layers at or lower than Layer 2. The IAB node 300-1 performs relay of data without using layers at or higher than Layer 3 (specifically, layers at or higher than the PDCP). Note that the IAB node 300-2 includes a protocol stack configuration similar to that of the IAB node 300-1.

The protocol stack configuration in the user plane has been described above. However, in the control plane, each of the gNB 200-1, the IAB node 300-1, the IAB node 300-2, and the UE 100-3 includes a Radio Resource Control (RRC) corresponding to Layer 3.

RRC connection is established between the RRC of the gNB 200-1 (donor gNB) and the RRC of the IAB node 300-1, and an RRC message is transmitted and received using the RRC connection. RRC connection is established between the RRC of the gNB 200-1 and the RRC of the IAB node 300-2, and an RRC message is transmitted and received using the RRC connection. In addition, RRC connection is established between the RRC of the gNB 200-1 and the RRC of the UE 100-3, and an RRC message is transmitted and received using the RRC connection.

Operation in Mobile Communication System

Operation in the mobile communication system 1 according to the present embodiment will be described. Specifically, operation of a case in which the IAB node 300-1 is connected to the gNB 200-1 (donor gNB) by radio will be described.

In such a case, the IAB node 300-1 first establishes access link connection (first radio connection) with the gNB 200-1 by using the UE function. In other words, the IAB node 300-1 establishes access link connection with the gNB 200-1 by operating as the UE 100. The establishment of the access link connection includes establishment of RRC connection.

Next, while maintaining the access link connection, the gNB 200-1 transmits, to the IAB node 300-1, a message for establishing backhaul link connection (second radio connection) for the gNB function of the IAB node 300-1 between the IAB node 300-1 and the gNB 200-1. In the present embodiment, the message is an RRC reconfiguration message that is transmitted and received using RRC connection.

As a result, the backhaul link connection is established between the IAB node 300-1 and the gNB 200-1, and thus communication in the backhaul link can be appropriately started between the IAB node 300-1 and the gNB 200-1.

The RRC reconfiguration message for establishing the backhaul link connection may include configuration information of a bearer (or L2 link) constituting the backhaul link connection, and a cell ID that is to be transmitted by the IAB node 300-1 (specifically, transmission configuration of a reference signal and a synchronization signal associated with the cell ID). The RRC reconfiguration message is hereinafter referred to as an IAB node configuration message.

The IAB node configuration message may include configuration information of a default bearer (or a default link). The default bearer (or the default link) is, for example, a bearer (or a link) for performing relay of a System Information Block (SIB), relay of Msg3 from the UE, and the like.

The IAB node configuration message may include configuration information of the stack on the donor gNB 200-1 side, and optionally, configuration information of the stack on the IAB node 300-2 (or the UE 100) side. For the configuration information of the stack on the IAB node 300-2 (or the UE 100) side, a configuration group implicitly broadcast with the SIB of the donor gNB 200-1 may be reused, or the configuration information may be configured from an operator (OAM) (in advance).

The contents of the configuration in the IAB node configuration message may include, basically, all of the configurations included in the RRC reconfiguration message, and the following may be included: RLC configuration (operation modes such as Acknowledged Mode (AM)/Unacknowledged Mode (UM)/Transparent Mode (TM), a Logical Channel Prioritization (LCP) parameter, or the like), MAC configuration (Buffer Status Report (BSR)/Timing Advance Group (TAG)/Power Headroom (PHR) parameter, Discontinues Reception (DRX) configuration, or the like), and PHY configuration.

In the contents of the configuration in the IAB node configuration message, configuration of the adaptation layer (mapping (routing) configuration of a logical channel on a lower side or an upper side, priority configuration, or the like) may be included.

In addition, in the contents of the configuration in the IAB node configuration message, as necessary, a (virtual) IP address (specifically, an L3 address) of the IAB node 300-1 may be included. This is because, for example, the protocol stack of F1 is assumed to be SCTP over IP for establishing the F1 interface on the L2 link.

Note that the contents of the configuration of the IAB node configuration message are not limited to configuration information of an NR protocol, and may be configuration information of an LTE protocol (RLC, MAC, PHY).

In the present embodiment, before establishing backhaul link connection, the IAB node 300-1 may transmit, to the gNB 200-1, an indication indicating that the IAB node 300-1 has a function of the IAB node (specifically, a Layer 2 relay function) or that the IAB node 300-1 requests establishment of backhaul link connection. In this manner, the gNB 200-1 can appropriately start a procedure for establishing backhaul link connection. The indication is hereinafter referred to as an IAB indication. The IAB indication may include information indicating intention or capability as to whether a link protocol stack for the UE function in the IAB node 300-1 is prepared in LTE, is prepared in NR, or is prepared in both.

Note that the IAB node 300-1 may transmit the IAB indication after establishing the access link connection with the gNB 200-1, or may transmit the IAB indication during a procedure of establishing the access link connection with the gNB 200-1.

Conditions for enabling transmission of the IAB indication to the gNB may include a condition that the SIB including a donor function identifier indicating that the gNB has the donor function has been received from the gNB. In such a case, the IAB node 300-1 transmits the IAB indication to the gNB 200-1 only on the condition that the IAB node 300-1 has received the donor function identifier in the SIB from the gNB 200-1.

In the present embodiment, the gNB 200-1 may have the donor function of establishing the backhaul link connection with the IAB node 300-1. In this case, the gNB 200-1 receives the IAB indication from the IAB node 300-1, and then transmits the IAB node configuration message to the IAB node 300-1. In contrast, when the gNB 200-1 does not have the donor function, the gNB 200-1 may receive the IAB indication from the IAB node 300-1, and then transmit a handover request of requesting handover of the IAB node 300-1 to another gNB, instead of transmitting the IAB node configuration message to the IAB node 300-1. Here, it is preferable that the gNB 200-1 store information of another gNB having the donor function in advance. The gNB 200-1 may acquire the information of another gNB having the donor function from the IAB node 300-1. The IAB node 300-1 obtains the information from the 5GC 10 (core network), or checks the SIB (donor function identifier) of a neighbor cell. In this manner, the information of another gNB (neighbor cell) having the donor function is acquired, and the acquired information is reported to the gNB 200-1. The gNB 200-1 transmits the handover request to another gNB having the donor function, based on the stored information or the information acquired from the IAB node 300-1. In this manner, after the IAB node 300-1 is handed over to another gNB, the IAB node 300-1 can establish backhaul link connection with such another gNB. Alternatively, when the gNB 200-1 does not have the donor function, the IAB node 300-1 may request the 5GC 10 to perform handover to a cell (gNB) having the donor function, and the 5GC 10 may perform processing related to handover.

In the present embodiment, the gNB 200-1 may transmit measurement configuration for configuring radio measurement to the IAB node 300-1 in response to reception of the IAB indication from the IAB node 300-1. The IAB node 300-1 receives the measurement configuration from the gNB 200-1, and then transmits a measurement report including results of the radio measurement to the gNB 200-1. The gNB 200-1 determines whether the gNB 200-1 is an appropriate donor gNB or another gNB is the appropriate donor gNB, based on the measurement report from the IAB node 300-1. For example, based on the measurement report, when measurement results for another gNB are more satisfactory than measurement results for the gNB 200-1, and a difference between these measurement reports is larger than a threshold, the gNB 200-1 determines that such another gNB is the appropriate donor gNB. Otherwise, the gNB 200-1 determines that the gNB 200-1 is the appropriate donor gNB.

Then, when the gNB 200-1 determines that the gNB 200-1 is the appropriate donor gNB 200-1, the gNB 200-1 transmits the IAB node configuration message to the IAB node 300-1. In contrast, when the gNB 200-1 determines that another gNB is the appropriate donor gNB, the gNB 200-1 transmits a handover request of requesting handover of the IAB node 300-1 to such another gNB, instead of transmitting the IAB node configuration message to the IAB node 300-1. In this manner, the IAB node 300-1 can be handed over to another gNB having a more satisfactory radio state, and the IAB node 300-1 can establish backhaul link connection with such another gNB.

In the present embodiment, after establishing the backhaul link connection, the gNB 200-1 may transmit context information related to the IAB node 300-1 to another gNB. The context information includes connection configuration of the AS layer on a radio side (contents of RRC reconfiguration), PDU session resource configuration on a network side (UE ID of an AMF or a Radio Access Network (RAN), a session ID, Quality of Service (QoS)/slice configuration, or the like), other related information (history information such as operation and communication of the IAB node, and/or preference information), and the like.

Specifically, even when the gNB 200-1 does not determine to hand over the IAB node 300-1 to another gNB, the gNB 200-1 transmits context information related to the IAB node 300-1 to such another gNB in advance. In this manner, when a radio state between the gNB 200-1 and the IAB node 300-1 deteriorates and the IAB node 300-1 thus reestablishes radio connection with another gNB, prompt reestablishment can be performed by using context information being shared in advance.

Here, it is preferable that the gNB 200-1 store a table in which the IAB node 300-1 and candidates of the donor gNBs of the IAB node 300-1 are associated with each other. The gNB 200-1 transmits the context information to another gNB being a candidate in the table. In this manner, the gNB 200-1 can share the context information with another appropriate gNB.

(1) Example of Normal Operation Sequence

Figure 6:
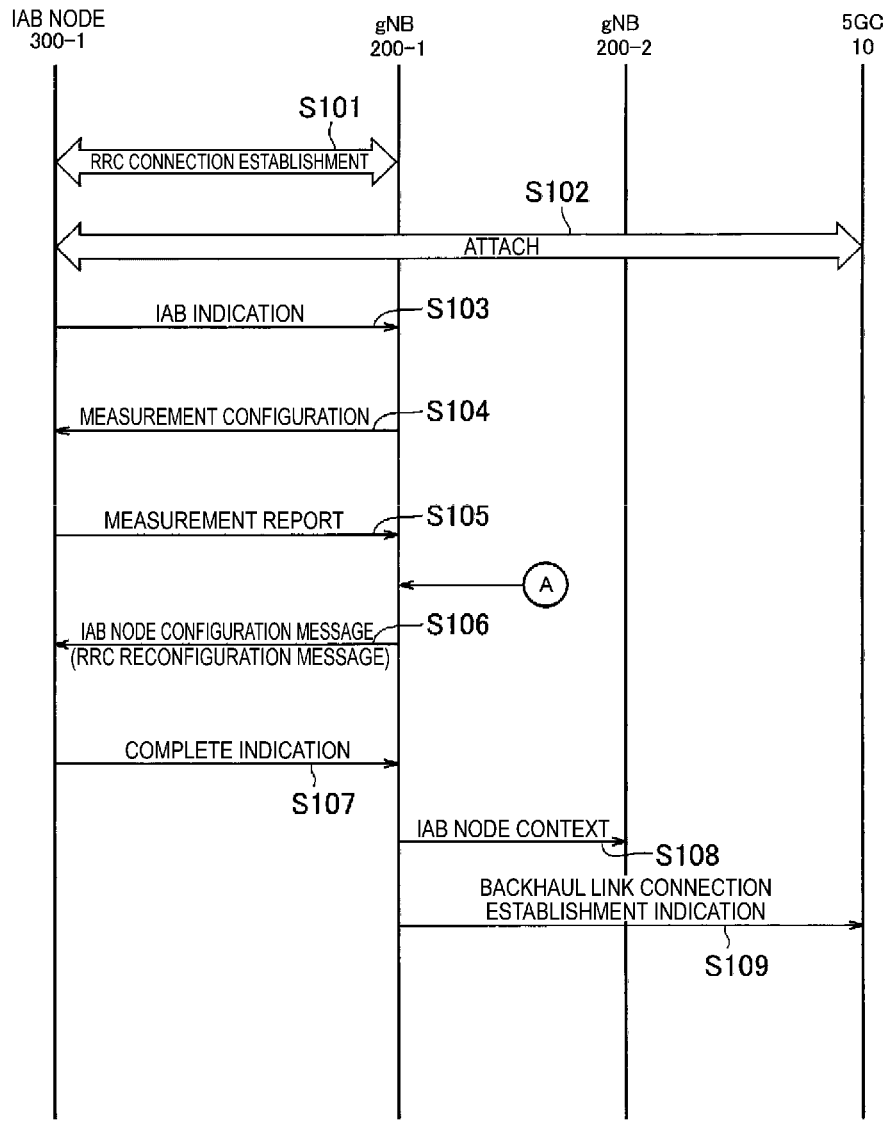
FIG. 6 is a diagram illustrating an example of a normal operation sequence according to a first embodiment.

FIG. 6 is a diagram illustrating an example of a normal operation sequence in the mobile communication system 1 according to the present embodiment.

As illustrated in FIG. 6, in Step S101, for example, the IAB node 300-1 performs a random access procedure for the gNB 200-1, and thereby establishes access link connection (RRC connection) with the gNB 200-1. The IAB node 300-1 may include the IAB indication in a message (for example, Msg3) to be transmitted to the gNB 200-1 during the random access procedure. In Step S101, the gNB 200-1 acquires context information related to the IAB node 300-1.

In Step S102, the IAB node 300-1 performs an attach procedure for the 5GC 10 (specifically, the AMF 11) via the gNB 200-1. Here, the IAB node 300-1 may transmit a report similar to the IAB indication (in other words, a report indicating intention to operate as the IAB node) to the AMF 11. In this manner, the IAB node 300-1 may obtain, from the AMF 11, routing information such as a candidate list of donor gNBs (cells) and presence or absence of a lower node, other management information, and the like. Alternatively, the AMF 11 may report, to each candidate of the donor gNB, indication that there has been attaching of the IAB node 300-1 and context information such as the routing information of the IAB node 300-1. Note that when the IAB node 300-1 has already attached, the attach processing in Step S102 can be omitted. Specifically, in Step S101, the IAB node 300-1 omits the attach processing when, for example, connection with the donor gNB needs to be reestablished due to occurrence of some error, such as in a case of RRC reestablishment.

In Step S103, the IAB node 300-1 transmits the IAB indication to the gNB 200-1. The IAB node 300-1 may transmit the IAB indication, with satisfaction of one or more of the following events being a trigger.

In a case of transmitting Msg5 (RRC Complete).
In a case where connection with the gNB is established (This may be Msg5 or later. For example, in a case where the first RRC reconfiguration is performed.)
In a case of obtaining IAB configuration information (see above) from the AMF (also including a case of already having the IAB configuration information).
In a case of simply having intention to operate as the IAB node (including receiving of an instruction of operating as the IAB node from the upper layer).
In a case of being requested to be the IAB node from the lower IAB node 300-2 or the UE 100-3 (in a case of receiving a signal indicating the request from the lower IAB node 300-2 or the UE 100-3).
In a case where the lower IAB node 300-2 or the UE 100-3 is already connected.

The IAB node 300-1 includes the IAB indication in an RRC message to be transmitted to the gNB 200-1, for example. The RRC message may be a "UE Capability Information" message indicating capability of the UE. Note that, when the IAB indication has been transmitted in Step S101, Step S103 can be omitted.

Alternatively, the IAB indication may be reported to the gNB 200-1 in the form of a modification of the PDU session resource from the AMF 11. Note that the AMF may be the AMF (dedicated) for IAB management.

In the present normal operation sequence, description is given on the assumption that the gNB 200-1 has donor capability. The gNB 200-1 determines that the gNB 200-1 needs to cause the IAB node 300-1 to establish backhaul link connection, based on the IAB indication.

In Step S104, the gNB 200-1 transmits a measurement configuration for configuring radio measurement to the IAB node 300-1. The IAB node 300-1 performs radio measurement, based on the measurement configuration. For example, the IAB node 300-1 performs measurement of received power (received power of a cell specific reference signal) for a cell of the gNB 200-1 being the current serving cell and a cell of the gNB 200-2 being a neighbor cell.

In Step S105, the IAB node 300-1 transmits a measurement report including results of the radio measurement to the gNB 200-1. The gNB 200-1 determines whether the gNB 200-1 is an appropriate donor gNB or another gNB is the appropriate donor gNB, based on the measurement report. Here, description is given on the assumption that the gNB 200-1 determines that the gNB 200-1 is the appropriate donor gNB. Note that processing of Step S104 and Step S105 is not essential, and may be omitted.

In Step S106, the gNB 200-1 transmits an IAB node configuration message (RRC reconfiguration message) to the IAB node 300-1. The IAB node configuration message may include a handover instruction that specifies the cell of the gNB 200-1 (specifically, the current serving cell of the IAB node 300-1) as a handover destination. The IAB node 300-1 performs processing of establishing the backhaul link connection with the gNB 200-1, based on the IAB node configuration message. The establishment processing includes processing of generating a protocol stack for a backhaul link (adaptation/RLC/MAC/PHY entity) and performing parameter configuration, based on the configuration information in the IAB node configuration message.

The establishment processing may include processing of preparing a protocol stack on the UE side (for an access link)

and starting transmission of a synchronization signal and a cell specific reference signal (or, processing of preparing for the starting).

In Step S107, the IAB node 300-1 transmits, to the gNB 200-1, a complete indication message indicating that the IAB node configuration including establishment of the backhaul link connection has completed. In or after Step S107, the IAB node 300-1 operates as the IAB node for the gNB 200-1, instead of operating as the UE.

In Step S108, the gNB 200-1 transfers the context information acquired in Step S101 to the gNB 200-2 over the Xn interface. The gNB 200-1 stores a table in which the IAB node 300-1 and candidates of the donor gNBs of the IAB node 300-1 are associated with each other, and determines a context transfer destination by referring to the table. With the gNB 200-1 transferring the context to another gNB in advance as described above, when the radio connection state with the gNB connecting to the IAB node 300-1 deteriorates, reconnection with such another gNB can be established immediately. FIG. 7 is a diagram illustrating an example of a table for determining the context transfer destination. The table is, for example, configured for each gNB by the operator in advance. As illustrated in FIG. 7, in the table, each IAB node is associated with candidates of the donor gNBs. Specifically, each identifier related to the IAB node is associated with identifiers of the candidates of the donor gNBs. For example, the gNBs that are geographically close to the IAB node are configured as the candidates of the donor gNBs of the IAB node. Note that the table of FIG. 7 illustrates an example of association with the gNBs, but association with cell IDs may be used. The cell ID may be a physical layer cell ID, or may be a global cell ID. Note that the gNB 200-1 may determine that the gNB 200-1 that is geographically close to the IAB node 300-1 is the donor candidate, based on the measurement report received from the IAB node 300-1. The gNB 200-1 may create a table in which the IAB node 300-1 and the candidates of the donor gNBs of the IAB node 300-1 are associated with each other or may update an existing table, based on the determined donor candidates.

In Step S109, the gNB 200-1 transmits a report indicating that the backhaul link connection with the IAB node 300-1 has established to the 5GC 10. Alternatively, the gNB 200-1 may transmit an establishment request of a PDU session for the IAB node to the 5GC 10. Note that, as described above, the establishment request of the PDU session may be transmitted from the AMF 11 to the gNB 200-1 prior to Step S109 or in Step S109.

(2) Example of Exceptional Operation Sequence

Figure 8:
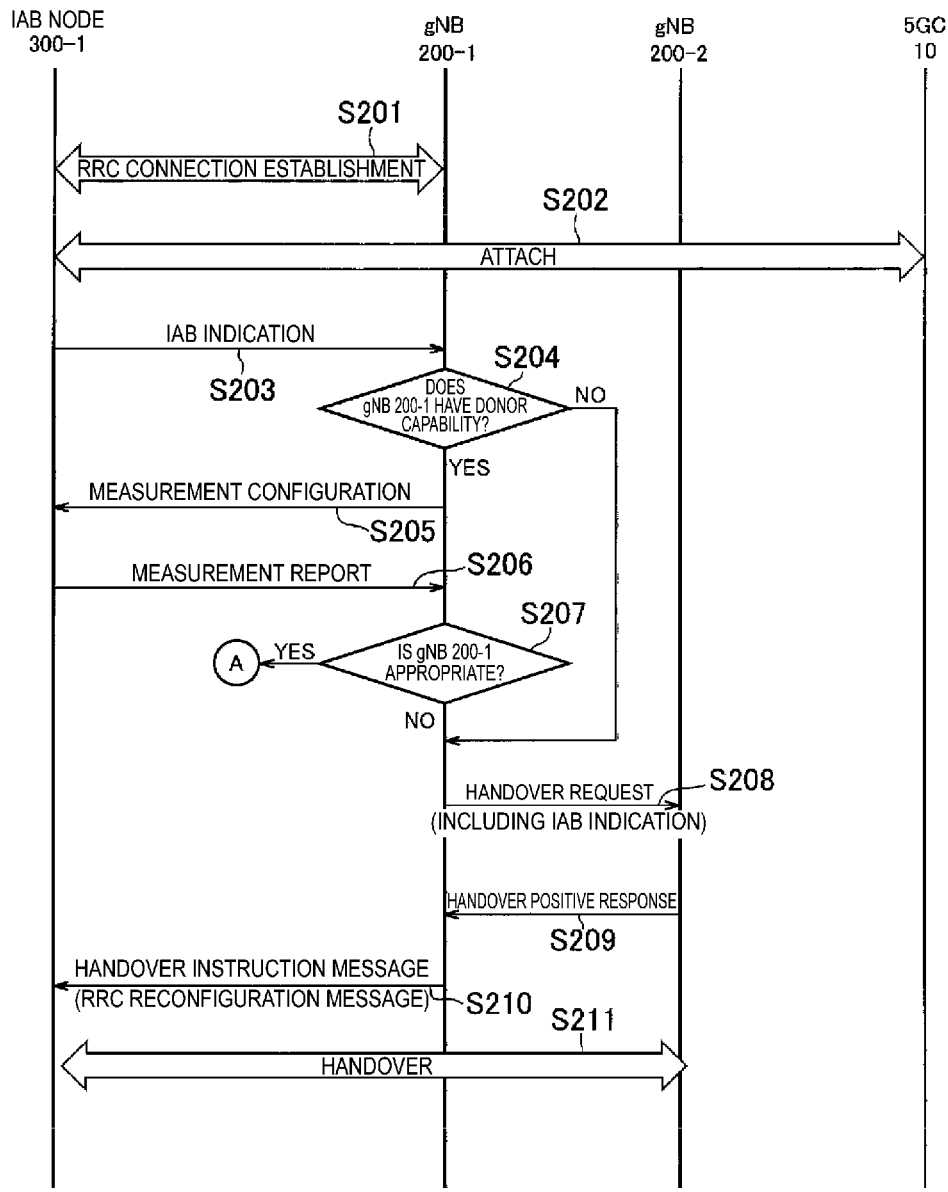
FIG. 8 is a diagram illustrating an example of an exceptional operation sequence according to the first embodiment.

FIG. 8 is a diagram illustrating an example of an exceptional operation sequence in the mobile communication system 1 according to the present embodiment. In the exceptional operation sequence, the gNB 200-1 hands over the IAB node 300-1 to the gNB 200-2.

As illustrated in FIG. 8, in Step S201, the IAB node 300-1 performs the random access procedure for the gNB 200-1, for example, and thereby establishes access link connection (RRC connection) with the gNB 200-1. The IAB node 300-1 may include the IAB indication in a message (for example, Msg3) to be transmitted to the gNB 200-1 during the random access procedure. In Step S201, the gNB 200-1 acquires context information related to the IAB node 300-1.

In Step S202, the IAB node 300-1 performs the attach procedure for the 5GC 10 (specifically, the AMF 11) via the gNB 200-1.

In Step S203, the IAB node 300-1 transmits the IAB indication to the gNB 200-1. The IAB node 300-1 includes the IAB indication in the RRC message to be transmitted to the gNB 200-1, for example. The RRC message may be a "UE Capability Information" message indicating capability of the UE. Note that, when the IAB indication has been transmitted in Step S201, Step S203 can be omitted.

In Step S204, the gNB 200-1 determines whether or not the gNB 200-1 has donor capability. When the gNB 200-1 does not have the donor capability (Step S204: NO), the gNB 200-1 causes the processing to proceed to Step S208.

When the gNB 200-1 has the donor capability (Step S204: YES), the gNB 200-1 transmits the measurement configuration for configuring radio measurement to the IAB node 300-1 in Step S205. The IAB node 300-1 performs radio measurement, based on the measurement configuration. For example, the IAB node 300-1 performs measurement of received power (received power of a cell specific reference signal) for a cell of the gNB 200-1 being the current serving cell and a cell of the gNB 200-2 being a neighbor cell.

In Step S206, the IAB node 300-1 transmits a measurement report including results of the radio measurement to the gNB 200-1.

In Step S207, the gNB 200-1 determines whether the gNB 200-1 is an appropriate donor gNB or another gNB is the appropriate donor gNB, based on the measurement report. When the gNB 200-1 determines that the gNB 200-1 is the appropriate donor gNB (Step S207: YES), the gNB 200-1 causes the processing to proceed to Step S106 of the normal operation sequence (see FIG. 6) described above.

In contrast, when the gNB 200-1 determines that another gNB is the appropriate donor gNB (Step S207: NO), the gNB 200-1 causes the processing to proceed to Step S208.

In Step S208, the gNB 200-1 transfers a handover request message including the IAB indication received from the IAB node 300-1 to the gNB 200-2 over the Xn interface. The gNB 200-1 may include the context information acquired in Step S201 in the handover request message. Alternatively, the gNB 200-1 may include information indicating that the IAB node 300-1 requests the gNB to function as the donor gNB in the handover request message, instead of including the IAB indication, and transmit the handover request message. Note that, in Step S208, the gNB 200-1 may transfer the handover request message to the gNB 200-2 over the Xn interface, after determining that the gNB 200-2 has the donor capability. Specifically, for example, when the gNB 200-1 determines that the gNB 200-2 is associated with the IAB node 300-1 as the donor candidate based on the table illustrated in FIG. 7, the gNB 200-1 may transfer the handover request message to the gNB 200-2. In this case, the probability that the gNB 200-2 rejects the handover request is reduced, and the handover of the IAB node 300-1 can be executed sooner. Alternatively, via the Xn interface, a plurality of gNBs 200 that neighbor each other may share information related to their donor capabilities with each other in advance. In this manner, the gNB 200-1 can identify the neighboring gNB 200 having the donor capability, and can transfer the handover request message to the identified neighboring gNB 200.

The gNB 200-2 determines whether or not to accept handover of the IAB node 300-1, also in consideration of the IAB indication included in the handover request message. When the gNB 200-2 does not have the donor capability, the gNB 200-2 may reject the handover request. Here, description is given on the assumption that the gNB 200-2 determines to accept handover of the IAB node 300-1.

In Step S209, the gNB 200-2 transmits a handover positive response message to the gNB 200-1 over the Xn interface.

In Step S210, the gNB 200-1 transmits a handover instruction message (RRC reconfiguration message) to the IAB node 300-1, based on the handover positive response message from the gNB 200-2. The handover instruction message includes information for specifying (a cell of) the gNB 200-2 that is the handover destination.

In Step S211, the IAB node 300-1 performs handover to the gNB 200-2, based on the handover instruction message from the gNB 200.

(3) Example of Multi-Hop Connection Sequence

Figure 9:
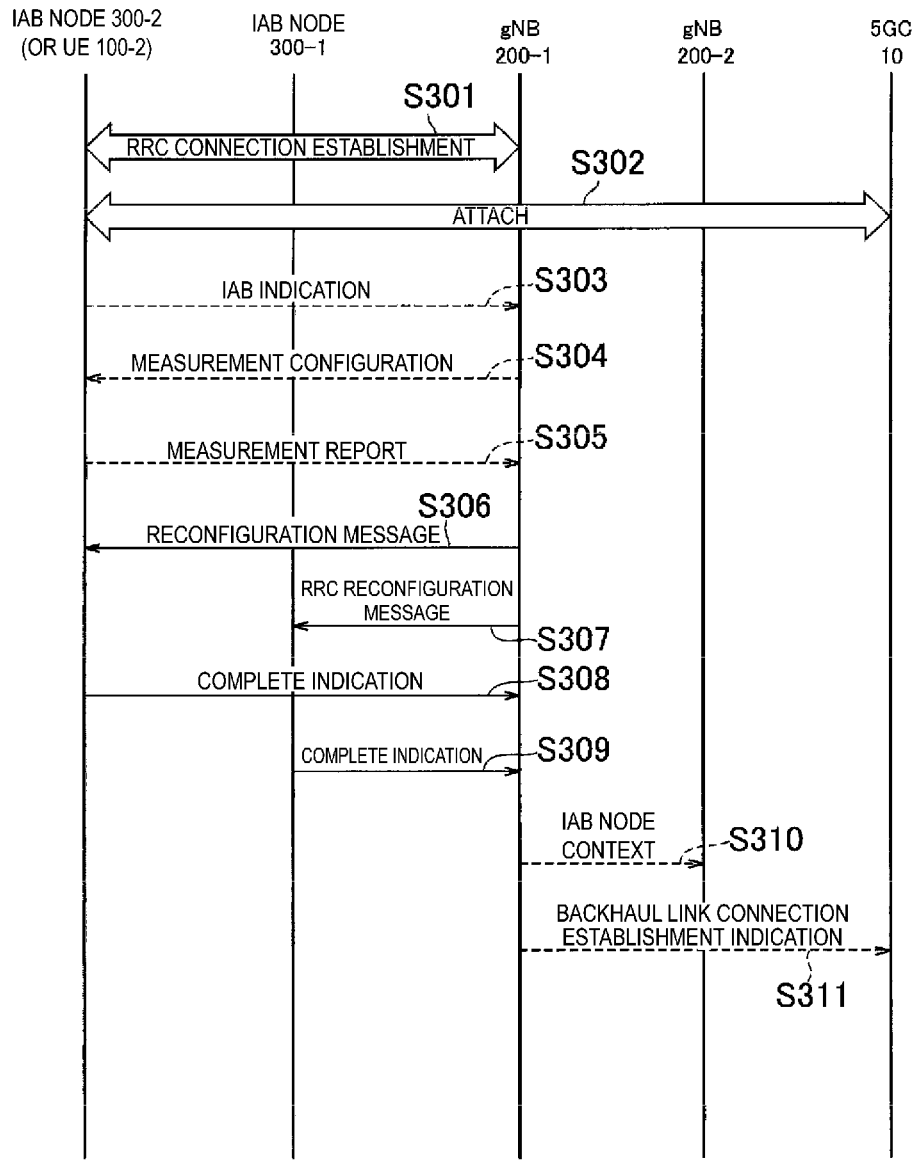
FIG. 9 is a diagram illustrating an example of a multi-hop connection sequence according to the first embodiment.

FIG. 9 is a diagram illustrating an example of a multi-hop connection sequence in the mobile communication system 1 according to the present embodiment. The multi-hop connection sequence is a sequence of a case in which the IAB node 300-2 or the UE 100-2 is connected to the IAB node 300-1 after the backhaul link connection is established between the IAB node 300-1 and the gNB 200-1. Here, a case in which the IAB node 300-2 is connected to the IAB node 300-1 will be mainly described, but the IAB node 300-2 may be read as the UE 100-2 as appropriate. Description overlapping with that of "(1) Normal Operation Sequence" described above will be omitted.

As illustrated in FIG. 9, in Step S301, the IAB node 300-2 performs the random access procedure for the gNB 200-1 via the IAB node 300-1, and thereby establishes access link connection (RRC connection) with the gNB 200-1. The IAB node 300-2 may include the IAB indication in a message (for example, Msg3) to be transmitted to the gNB 200-1 during the random access procedure. In Step S301, the gNB 200-1 acquires context information related to the IAB node 300-2.

In Step S302, the IAB node 300-2 performs the attach procedure for the 5GC 10 (specifically, the AMF 11) via the IAB node 300-2 and the gNB 200-1. Here, the IAB node 300-2 may transmit a report similar to the IAB indication (in other words, a report indicating intention to operate as the IAB node) to the AMF 11. In this manner, the IAB node 300-2 may obtain, from the AMF 11, routing information such as a candidate list of donor gNBs (cells) and presence or absence of a lower node, other management information, and the like. Alternatively, the AMF 11 may report indication that there has been attaching of the IAB node 300-2 and context information such as the routing information of the IAB node 300-2 to each candidate of the donor gNB. Note that when the IAB node 300-2 has already attached, the attach processing in Step S302 can be omitted. Specifically, the IAB node 300-2 omits the attach processing when, for example, connection with the donor gNB needs to be reestablished due to occurrence of some error, such as in a case of RRC reestablishment.

In Step S303, the IAB node 300-2 transmits the IAB indication to the gNB 200-1 via the IAB node 300-1. The IAB node 300-2 may transmit the IAB indication in response to a trigger similar to the trigger described in Step S103 of "(1) Normal Operation Sequence" described above.

The IAB node 300-2 includes the IAB indication in an RRC message to be transmitted to the gNB 200-1, for example. The RRC message may be a "UE Capability Information" message indicating capability of the UE. Note that, when the IAB indication has been transmitted in Step S301, Step S303 can be omitted.

Alternatively, the IAB indication may be reported to the gNB 200-1 in the form of a modification of the PDU session resource from the AMF 11. Note that the AMF may be the AMF (dedicated) for IAB management.

In the present operation sequence, it is assumed that the gNB 200-1 has the donor capability. Thus, the gNB 200-1 determines that the backhaul link connection needs to be established between the IAB node 300-1 and the IAB node 300-2, based on the IAB indication.

In Step S304, the gNB 200-1 transmits measurement configuration for configuring radio measurement to the IAB node 300-2. The IAB node 300-2 performs radio measurement, based on the measurement configuration.

In Step S305, the IAB node 300-2 transmits a measurement report including results of the radio measurement to the gNB 200-1 via the IAB node 300-1. The gNB 200-1 determines whether the gNB 200-1 is an appropriate donor gNB or another gNB is the appropriate donor gNB, based on the measurement report. Here, description is given on the assumption that the gNB 200-1 determines that the gNB 200-1 is the appropriate donor gNB. Note that processing of Step S304 and Step S305 is not essential, and may be omitted.

In Step S306, the gNB 200-1 transmits the IAB node configuration message (RRC reconfiguration message) to the IAB node 300-2. The IAB node 300-2 performs processing of establishing the backhaul link connection with the IAB node 300-1, based on the IAB node configuration message. The establishment processing includes processing of generating a protocol stack for a backhaul link (adaptation/RLC/MAC/PHY entity) and performing parameter configuration, based on the configuration information in the IAB node configuration message. The establishment processing may include processing of preparing a protocol stack on the UE side (for an access link) and starting transmission of a synchronization signal and a cell specific reference signal (or, processing of preparing for the starting).

In Step S307, the gNB 200-1 transmits the RRC reconfiguration message to the IAB node 300-1. The RRC reconfiguration message is a message for changing the configuration in the IAB node 300-1 due to addition of the IAB node 300-2. The RRC reconfiguration message includes, for example, mapping information indicating association between the logical channel of the IAB node 300-2 and the logical channel of the backhaul link of the IAB node 300-1. Note that Step S307 may be prior to Step S306, or may be simultaneous with Step S306.

In Step S308, the IAB node 300-2 transmits, to the gNB 200-1, a complete indication message indicating that the IAB node configuration including establishment of the backhaul link connection with the IAB node 300-1 has completed. In or after Step S308, the IAB node 300-2 operates as the IAB node for the gNB 200-1, instead of operating as the UE.

In Step S309, the IAB node 300-1 transmits, to the gNB 200-1, a complete indication message indicating that configuration change due to the establishment of the backhaul link connection with the IAB node 300-2 has completed. Note that Step S309 may be prior to Step S308, or may be simultaneous with Step S308.

In Step S310, the gNB 200-1 transfers the context information of the IAB node 300-2 acquired in Step S301 to the gNB 200-2 over the Xn interface.

In Step S311, the gNB 200-1 transmits a report indicating that the backhaul link connection of the IAB node 300-2 has established to the 5GC 10. Alternatively, the gNB 200-1 may transmit an establishment request of a PDU session for the IAB node 300-2 to the 5GC 10. Note that, as described above, the establishment request of the PDU session may be transmitted from the AMF 11 to the gNB 200-1 prior to S311 or in Step S311.

Modification Examples of First Embodiment

In the first embodiment described above, an example has been described, in which the IAB node 300-1 is handed over in a case where the IAB node 300-1 is connected to the gNB 200-1 by radio, but then the gNB 200-1 does not have the donor capability. However, each gNB 200 may provide the IAB node 300-1 with information related to whether or not the gNB 200 has the donor capability. In this manner, the IAB node 300-1 can select the gNB 200 having the donor capability and then connect to the gNB 200. For example, the gNB 200 having the donor capability includes information indicating that the gNB 200 has the donor capability in the system information block (SIB) and broadcasts the SIB. The IAB node 300-1 selects the gNB 200 to be a connection destination, based on the SIB. When the gNB 200 has the donor capability and received power from the gNB 200 is a threshold or higher, the IAB node 300-1 may select this gNB 200 as the connection destination. Alternatively, when the gNB 200 does not have the donor capability, the IAB node 300-1 may reselect another gNB 200 in response to reception of the SIB transmitted from the gNB 200. Subsequently, when it is indicated based on the SIB transmitted from another gNB 200 that such another gNB 200 has the donor capability, the IAB node 300-1 may perform the random access procedure and transmit the IAB indication, with such another gNB 200 as the connection destination.

Alternatively, each gNB 200 may report that the gNB 200 has capability of handling the IAB node 300 by using the SIB, in addition to or instead of reporting that the gNB 200 has the donor capability by using the SIB. For example, each gNB 200 may report that the gNB 200 has a function of handing over the IAB node 300 to another gNB (donor gNB) by using the SIB.

In the first embodiment described above, an example has been described, in which the IAB node 300 includes the IAB indication in a message (for example, Msg3) to be transmitted to the gNB 200 during the random access procedure. Here, the Msg3 is, for example, an RRC Setup Request message. The IAB node 300 may include the IAB indication in an Establishment Cause being a field (information element) in the Msg3.

Alternatively, the IAB node 300 may report the IAB indication by using a random access preamble (Msg1) transmitted to the gNB 200 during the random access procedure. For example, when Physical Random Access Channel (PRACH) resources for the IAB indication are reported using the SIB, the IAB node 300 may report the IAB indication by transmitting the random access preamble using the PRACH resource selected out of the reported PRACH resources for the IAB indication. Here, the PRACH resource may be a time and frequency resource, or may be a signal sequence (preamble sequence).

Alternatively, the IAB node 300 may report the IAB indication at timing other than the random access procedure. For example, the IAB node 300 may include the IAB indication in an RRC message such as a UE Assistance Information message.

In the first embodiment described above, the following example has been described: The gNB 200 transmits the measurement configuration for configuring the radio measurement to the IAB node 300 or the UE 100, and receives the measurement report including results of the radio measurement.

The gNB 200 thereby determines whether the gNB 200 is the appropriate donor gNB or another gNB is the appropriate donor gNB, based on the measurement report. However, the gNB 200 may use the measurement report for change of a network topology and a change of a data transfer path, not only in the case of using measurement results at the time of such initial connection.

Second Embodiment

Regarding a second embodiment, the difference from the first embodiment described above will mainly be described. The second embodiment is an embodiment in which automatic retransmission control (Automatic Repeat reQuest (ARQ)) in the RLC layer of an Acknowledged Mode (AM) is focused.

When the IAB node 300 is involved in communication between the UE 100 and the gNB (donor gNB) 200, there are a method of performing the ARQ in an "end-to-end" manner and a method of performing the ARQ in a "hop-by-hop" manner. Note that uplink data transfer according to the present embodiment will mainly be described. Note that the data transfer may be downlink data transfer, not limited to uplink data transfer.

Figure 10:
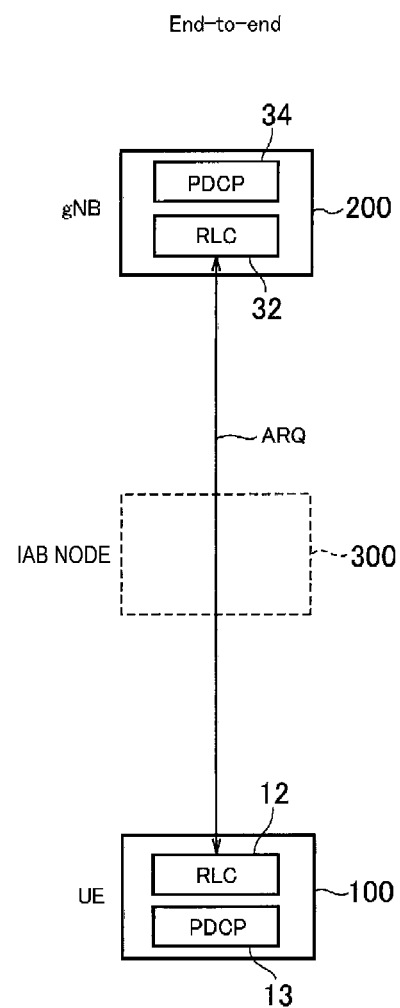
FIG. 10 is a diagram illustrating an example of "end-to-end" according to a second embodiment.

FIG. 10 is a diagram illustrating an example of "end-to-end".

As illustrated in FIG. 10, when the ARQ is performed in an "end-to-end" manner, a transmission side RLC entity 12 of the UE 100 transmits uplink data to a reception side RLC entity 32 of the gNB 200 via the IAB node 300, and stores the uplink data. When the uplink data misses during the transmission, the reception side RLC entity 32 of the gNB 200 transmits a negative acknowledgement (Nack) indicating that the reception side RLC entity 32 has failed in receiving the uplink data to the transmission side RLC entity 12 of the UE 100 via the IAB node 300. The transmission side RLC entity 12 of the UE 100 retransmits the stored uplink data in response to reception of the Nack.

In contrast, when the reception side RLC entity 32 of the gNB 200 succeeds in receiving the uplink data, the reception side RLC entity 32 of the gNB 200 transmits a positive acknowledgement (Ack) indicating that the reception side RLC entity 32 has succeeded in receiving the uplink data to the transmission side RLC entity 12 of the UE 100 via the IAB node 300. Note that the reception side RLC entity 32 of the gNB 200 may transmit an Ack according to a request (Status PDU) from the transmission side RLC entity 12 of the UE 100. Specifically, Acks for a plurality of PDUs can be collectively transmitted, and thus each Ack is not immediately returned in a case of succeeding in reception. In response to reception of the Ack, the transmission side RLC entity 12 of the UE 100 discards stored uplink data, and reports data transmission success to the PDCP entity 13 of the UE 100. Note that the Ack may be returned every time reception of one PDU succeeds.

Note that data transmitted by the RLC entity is referred to as an "RLC data PDU (Protocol Data Unit)", and data transmitted by the RLC entity in the AM in particular is referred to as an "AMD (AM Data) PDU". The transmission side of the AMD PDU is referred to as a "transmitting AM RLC entity", and the reception side of the AMD PDU is referred to as a "receiving AM RLC entity". The Ack and the Nack are included in the PDU referred to as a "STATUS PDU". The "STATUS PDU" is a type of "RLC control PDU".

In this manner, even when the IAB node 300 is involved in communication between the UE 100 and the gNB 200, by performing the ARQ in an "end-to-end" manner, it can be ensured that data missing on the data transfer path is transmitted to the reception side through retransmission.

In contrast, when the ARQ is performed in a "hop-by-hop" manner, not in an "end-to-end" manner, data missing on the data transfer path may not be able to be retransmitted.

Figure 11:
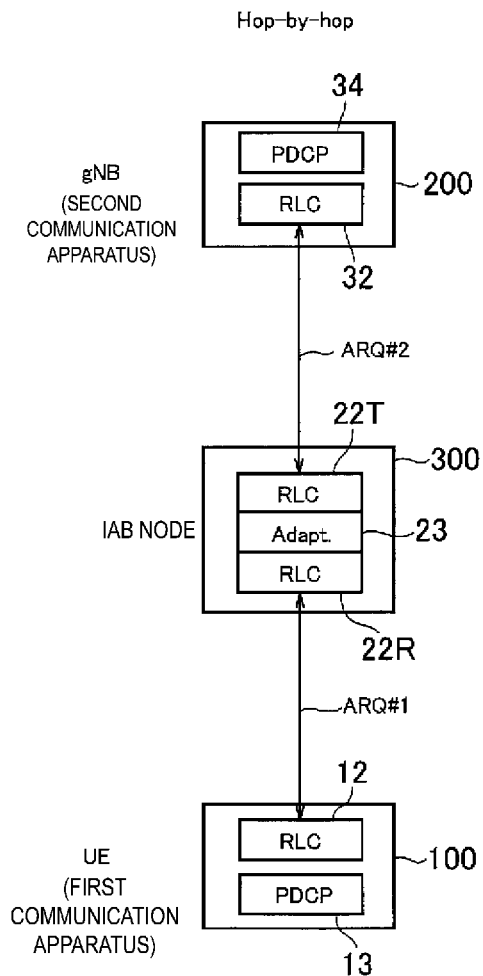
FIG. 11 is a diagram illustrating an example of "hop-by-hop" according to the second embodiment.

FIG. 11 is a diagram illustrating an example of "hop-by-hop".

As illustrated in FIG. 11, ARQ #1 between the UE 100 and the IAB node 300 and ARQ #2 between the IAB node 300 and the gNB 200 are individually performed. First, the transmission side RLC entity 12 of the UE 100 transmits uplink data to the reception side RLC entity 22R of the IAB node 300, and the reception side RLC entity 22R of the IAB node 300 transmits an Ack to the transmission side RLC entity 12 of the UE 100. In this case, the transmission side RLC entity 12 of the UE 100 determines transmission success of the uplink data. The PDCP entity 13 of the UE 100 eliminates (may discard) the uplink data, the transmission success of which has been determined by the transmission side RLC entity 12, from retransmission targets using PDCP Data Recovery processing.

Next, the uplink data misses when a transmission side RLC entity 22T of the IAB node 300 transmits the uplink data to the reception side RLC entity 32 of the gNB 200. In this case, the reception side RLC entity 32 of the gNB 200 transmits a Nack to the transmission side RLC entity 22T of the IAB node 300, and the transmission side RLC entity 22T of the IAB node 300 retransmits the uplink data. When data cannot be recovered in ARQ #2 between the IAB node 300 and the gNB 200, a PDCP entity 34 of the gNB 200 requests the PDCP entity 13 of the UE 100 to perform retransmission by using PDCP Data Recovery being a system of retransmission of the PDCP layer. However, there is a possibility that, because the PDCP entity 13 of the UE 100 determines that the data transmission to the IAB node 300 has succeeded, retransmission in the PDCP layer may not be performed.

In order to solve the problem in "hop-by-hop" as described above, the IAB node 300 according to the present embodiment performs the following operation. As illustrated in FIG. 11, the IAB node 300 includes the reception side RLC entity 22R that receives uplink data from the first communication apparatus, and the transmission side RLC entity 22T that transmits the uplink data received by the reception side RLC entity 22R to the second communication apparatus. In the example of FIG. 11, the first communication apparatus is the UE 100. However, the first communication apparatus may be another IAB node being interposed between the UE 100 and the IAB node 300. In the example of FIG. 11, the second communication apparatus is the gNB 200. However, the second communication apparatus may be another IAB node being interposed between the gNB 200 and the IAB node 300.

The transmission side RLC entity 22T receives, from the second communication apparatus, a first positive response (Ack) indicating that the second communication apparatus has succeeded in receiving the transmitted uplink data. The reception side RLC entity 22R transmits, to the first communication apparatus, a second positive response (Ack) indicating that the reception side RLC entity 22R has succeeded in receiving the uplink data, in response to reception of the first positive response (Ack) by the transmission side RLC entity 22T. Specifically, the reception side RLC entity 22R does not transmit the second positive response (Ack) to the first communication apparatus until the transmission side RLC entity 22T receives the first positive response (Ack).

In this manner, in the IAB node 300, the reception side RLC entity 22R does not transmit the Ack corresponding to the uplink data to the first communication apparatus until the transmission side RLC entity 22T confirms transmission success of the uplink data. In this manner, the first communication apparatus stores the uplink data until the first communication apparatus receives the Ack corresponding to the uplink data from the reception side RLC entity 22R, and thus the problem in "hop-by-hop" described above can be solved.

The IAB node 300 may include an entity 23 of the adaptation layer (Adapt.) that is a layer higher than the reception side RLC entity 22R and the transmission side RLC entity 22T. The entity of the adaptation layer is hereinafter referred to as an "adaptation entity". When there are a plurality of reception side RLC entities 22R and a plurality of transmission side RLC entities 22T, the adaptation entity 23 manages mapping information indicating association between the reception side RLC entities 22R and the transmission side RLC entities 22T. The adaptation entity 23 may manage the mapping information for each logical channel (LCH), or may manage the mapping information for each identifier (for example, a Cell-Radio Network Temporary Identifier (C-RNTI) or the like) of the UE 100.

The adaptation entity 23 acquires information related to the first positive response (Ack) from the transmission side RLC entity 22T, and provides the acquired information to the reception side RLC entity 22R. The reception side RLC entity 22R confirms that the transmission side RLC entity 22T has received the first positive response (Ack), based on the information provided from the adaptation entity 23.

For example, the transmission side RLC entity 22T reports the STATUS PDU (Ack/Nack) to the adaptation entity 23 as the transmission acknowledgment information from the reception side RLC entity 32 of the second communication apparatus. Alternatively, the transmission side RLC entity 22T may report Ack/Nack information based on the STATUS PDU to the adaptation entity 23 as the transmission acknowledgment information. The Ack/Nack information may include a sequence number (SN) of succeeding in transmission, and a sequence number (SN) of failing in transmission. The adaptation entity 23 transfers the transmission acknowledgment information from the transmission side RLC entity 22T to the corresponding reception side RLC entity 22R. The reception side RLC entity 22R acquires the transmission acknowledgment information transferred from the adaptation entity 23, and when the reception side RLC entity 22R can confirm transmission success of the RLC PDU (AMD PDU), the reception side RLC entity 22R determines that a state is obtained in which the Ack can be transmitted regarding the RLC PDU (AMD PDU).

In the present embodiment, an example in which the IAB node 300 includes the independent adaptation entity 23 is assumed. However, the IAB node 300 need not include the independent adaptation entity 23. The function of the adaptation entity 23 may be integrated with an entity of another layer (for example, the RLC, the MAC). In such a case, delivery of the transmission acknowledgment information may be directly performed between the reception side RLC entity 22R and the transmission side RLC entity 22T, or delivery of the transmission acknowledgment information may be performed via the RRC entity.

In the present embodiment, the reception side RLC entity 22R may count waiting time from when uplink data is received from the first communication apparatus to when the transmission side RLC entity 22T receives the first positive response (Ack) (or to when the reception side RLC entity 22R acquires the transmission acknowledgment information from the transmission side RLC entity 22T or determines that a state is obtained in which the Ack can be transmitted regarding the RLC PDU (AMD PDU)). When the waiting time exceeds certain time, the reception side RLC entity 22R may transmit a negative response (Nack) indicating that the reception side RLC entity 22R has failed in receiving the uplink data to the first communication apparatus. When the reception side RLC entity 22R receives the uplink data retransmitted from the first communication apparatus in response to the negative response (Nack), the transmission side RLC entity 22T may attempt retransmission to the second communication apparatus with the received uplink data. Alternatively, when the waiting time exceeds the certain time, the reception side RLC entity 22R may transmit a message for requesting the PDCP entity 13 of the UE 100 to trigger PDCP Data Recovery. The message may be reported to an upper layer (for example, the adaptation entity 23 or the RRC entity) from the reception side RLC entity 22R, and transmitted from the upper layer to the UE 100.

For example, when the reception side RLC entity 22R receives the uplink data (RLC PDU) from the first communication apparatus, the reception side RLC entity 22R starts a timer. The certain time is configured for the timer, and when the certain time elapses (specifically, the timer expires), the reception side RLC entity 22R transmits the negative response (Nack) to the first communication apparatus. When the transmission side RLC entity 22T receives the first positive response (Ack) from the second communication apparatus (or when the reception side RLC entity 22R acquires the transmission acknowledgment information from the transmission side RLC entity 22T or determines that a state is obtained in which the Ack can be transmitted regarding the RLC PDU (AMD PDU)) while the timer runs (specifically, before the timer expires), the reception side RLC entity 22R stops the timer. Note that the certain time configured for the timer may be specified from the gNB 200 using RRC signaling, for example, or may be stored in the IAB node 300 in advance. The certain time configured for the timer may be transferred from another IAB node 300. The reception side RLC entity 22R may change operation performed when the timer expires according to configuration from the gNB 200. For example, the reception side RLC entity 22R may be configured to transmit the second positive response (Ack) to the first communication apparatus when the timer expires.

In the present embodiment, it is preferable that the transmission side RLC entity 12 of the UE 100 (first communication apparatus) configure the timer defining maximum waiting time of the Ack (or maximum waiting time of the STATUS PDU) to be longer than usual so as not to determine that transmission has failed even when the waiting time of the Ack is long. For example, the gNB 200 may configure a timer value longer than usual for the transmission side RLC entity 12 of the UE 100 (first communication apparatus) by using RRC signaling. The transmission side RLC entity 12 of the UE 100 does not request the reception side RLC entity 22R of the IAB node 300 to transmit the STATUS PDU while the timer runs.

Figure 12:
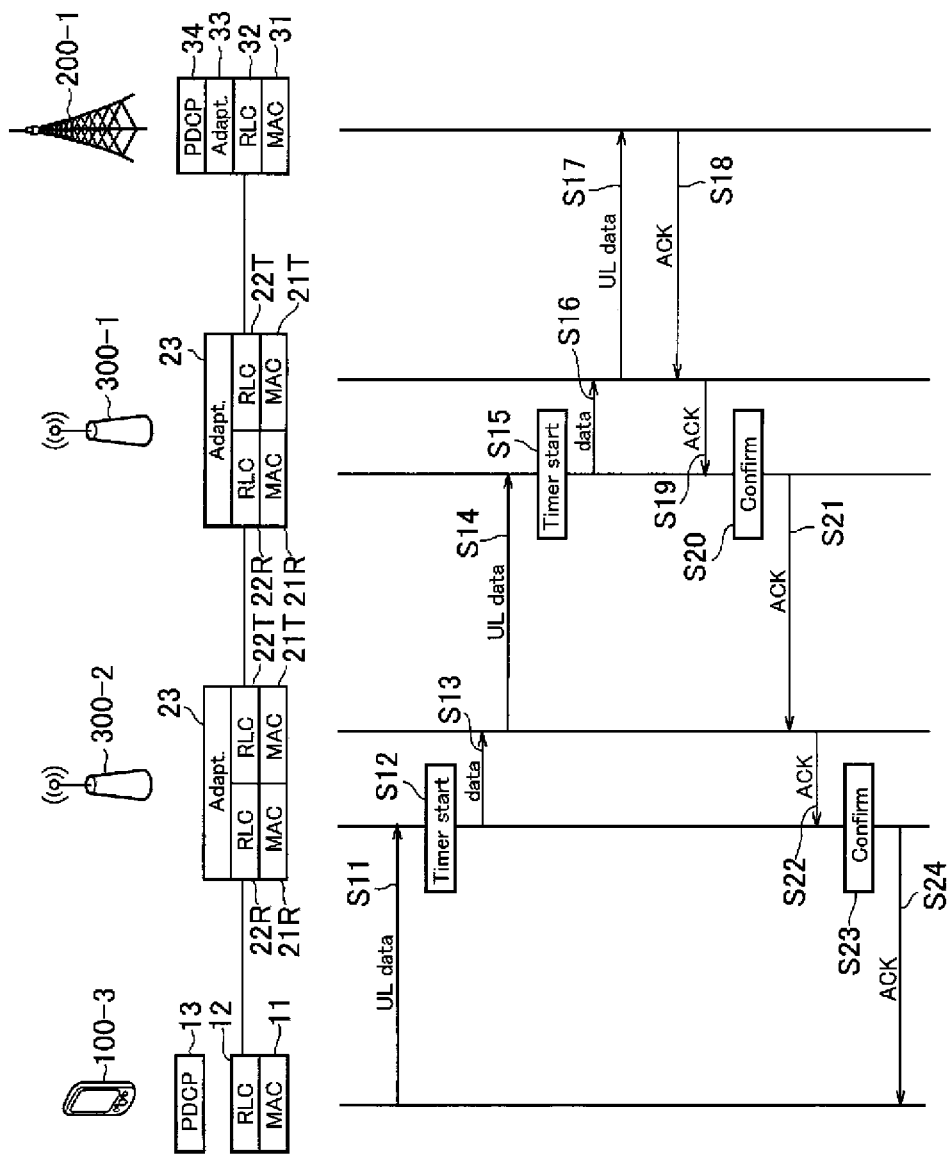
FIG. 12 is a sequence diagram illustrating an operation example according to the second embodiment.

FIG. 12 is a sequence diagram illustrating an operation example according to the present embodiment.

Here, a case in which uplink data transfer is performed between the UE 100-3 and the gNB 200-1 illustrated in FIG. 1 is assumed. In the present operation example, the second communication apparatus is the IAB node 300-1 involved in communication between the IAB node 300-2 and the gNB 200-1 (donor gNB).

As illustrated in FIG. 12, in Step S11, the transmission side RLC entity 12 of the UE 100-3 receives the PDCP PDU from the PDCP entity 13 as an RLC Service Data Unit (SDU), generates the RLC PDU from the RLC SDU, and transmits the generated RLC PDU to the IAB node 300-2 via the MAC entity 11. The reception side RLC entity 22R of the IAB node 300-2 receives the RLC PDU via a MAC entity 21R.

In Step S12, by starting the timer in response to reception of the RLC PDU, the reception side RLC entity 22R of the IAB node 300-2 counts the waiting time until the transmission side RLC entity 22T of the IAB node 300-2 receives the Ack. Note that the timer may be provided for each RLC PDU, or may be provided for each group including a plurality of RLC PDUs. In other words, when the timer is provided for each group including a plurality of RLC PDUs, the reception side RLC entity 22R of the IAB node 300-2 may start the timer when the reception side RLC entity 22R receives the plurality of RLC PDUs. In that case, in response to reception of the Ack corresponding to the plurality of RLC PDUs by the transmission side RLC entity 22T in Step S21 to be described later, the reception side RLC entity 22R of the IAB node 300-2 may transmit the Ack to the UE 100-3 in Step S24 to be described later.

In Step S13, the reception side RLC entity 22R of the IAB node 300-2 provides the RLC SDU to the transmission side RLC entity 22T of the IAB node 300-2 via the adaptation entity 23 of the IAB node 300-2.

In Step S14, the transmission side RLC entity 22T of the IAB node 300-2 generates the RLC PDU from the RLC SDU received from the adaptation entity 23, and transmits the generated RLC PDU to the IAB node 300-1 via the MAC entity 21. The reception side RLC entity 22R of the IAB node 300-1 receives the RLC PDU via the MAC entity 21R.

In Step S15, by starting the timer in response to reception of the RLC PDU, the reception side RLC entity 22R of the IAB node 300-1 counts the waiting time until the transmission side RLC entity 22T of the IAB node 300-1 receives the Ack.

In Step S16, the reception side RLC entity 22R of the IAB node 300-1 provides the RLC SDU to the transmission side RLC entity 22T of the IAB node 300-1 via the adaptation entity 23 of the IAB node 300-1.

In Step S17, the transmission side RLC entity 22T of the IAB node 300-1 generates the RLC PDU from the RLC SDU received from the adaptation entity 23, and transmits the generated RLC PDU to the gNB 200-1 via the MAC entity 21. The reception side RLC entity 32 of the gNB 200-1 receives the RLC PDU via a MAC entity 31. The reception side RLC entity 32 of the gNB 200-1 provides the RLC SDU corresponding to the received RLC PDU to the PDCP entity 34 via an adaptation entity 33.

In Step S18, the reception side RLC entity 32 of the gNB 200-1 transmits the STATUS PDU including the Ack corresponding to the RLC PDU received in Step S17 to the IAB node 300-1 via the MAC entity 31. The STATUS PDU may include the Ack/Nack corresponding to other RLC PDUs. The transmission side RLC entity 22T of the IAB node 300-1 receives the STATUS PDU via a MAC entity 21T.

In Step S19, the transmission side RLC entity 22T of the IAB node 300-1 provides the received STATUS PDU or transmission acknowledgment information based on the received STATUS PDU to the reception side RLC entity 22R of the IAB node 300-1 via the adaptation entity 23 of the IAB node 300-1.

In Step S20, the reception side RLC entity 22R of the IAB node 300-1 confirms that the transmission side RLC entity 22T of the IAB node 300-1 has received the Ack corresponding to the RLC PDU received in Step S14, based on the transmission acknowledgment information.

In Step S21, the reception side RLC entity 22R of the IAB node 300-1 transmits the STATUS PDU including the Ack corresponding to the RLC PDU received in Step S14 to the IAB node 300-2 via the MAC entity 21R. The transmission side RLC entity 22T of the IAB node 300-2 receives the STATUS PDU via the MAC entity 21T.

In Step S22, the transmission side RLC entity 22T of the IAB node 300-2 provides the transmission acknowledgment information based on the received STATUS PDU to the reception side RLC entity 22R of the IAB node 300-2 via the adaptation entity 23 of the IAB node 300-2.

In Step S23, the reception side RLC entity 22R of the IAB node 300-2 confirms that the transmission side RLC entity 22T of the IAB node 300-2 has received the Ack corresponding to the RLC PDU received in Step S11, based on the transmission acknowledgment information.

In Step S24, the reception side RLC entity 22R of the IAB node 300-2 transmits the STATUS PDU including the Ack corresponding to the RLC PDU received in Step S11 to the UE 100-3 via the MAC entity 21R. The transmission side RLC entity 12 of the UE 100-3 receives the STATUS PDU via the MAC entity 11, confirms transmission success of the RLC PDU transmitted in Step S11, and reports this to the PDCP entity 13.

In the embodiment described above, an example has been mainly described, in which the gNB 200-1 and each IAB node normally receive the RLC PDU and transmit the STATUS PDU including the Ack. A case in which the gNB 200-1 and each IAB node do not normally receive the RLC PDU will be described below.

The reception side RLC entity of the gNB 200-1 or each IAB node 300-1 transmits the STATUS PDU including the Nack to the transmission side RLC entity of each IAB node 300-1 (300-2). In that case, the transmission side RLC entity 22T of each IAB node 300-1 (300-2) retransmits the RLC PDU, in response to reception of the STATUS PDU. Subsequently, when the transmission side RLC entity 22T of each IAB node 300-1 (300-2) receives the STATUS PDU including the Ack, similarly to the embodiment described above, the transmission side RLC entity 22T provides the transmission acknowledgment information based on the received STATUS PDU to the reception side RLC entity 22R of the IAB node 300-1 (300-2) via the adaptation entity 23 of each IAB node 300-1 (300-2).

When the transmission side RLC entity 22T of the IAB node 300-1 (300-2) cannot retransmit the RLC PDU, the transmission side RLC entity 22T receives the STATUS PDU including the Nack a predetermined number of times, or the timer expires, the transmission side RLC entity 22T may transmit the STATUS PDU including the Nack to the IAB node 300-2 or the UE 100-3.

Figure 13:
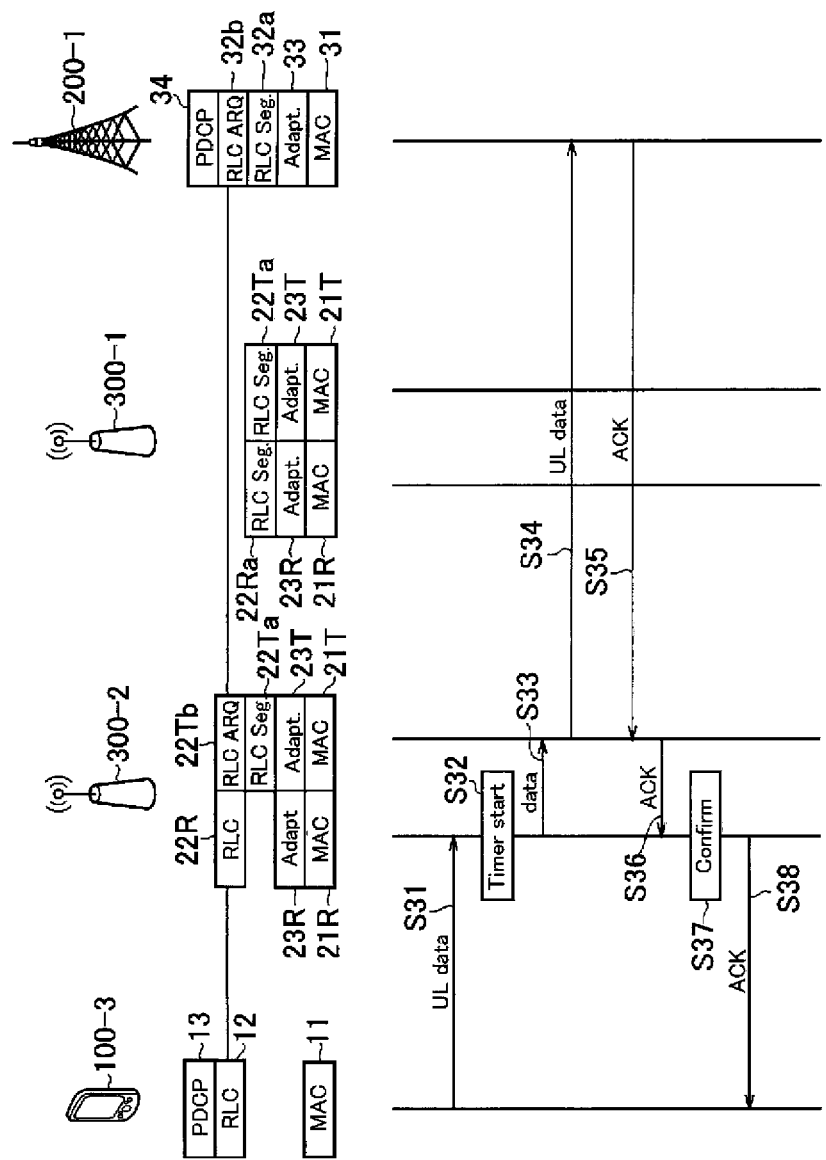
FIG. 13 is a sequence diagram illustrating another operation example according to the second embodiment.

Note that the IAB node 300-1 (300-2) may stop the timer when transmitting the STATUS PDU including the Nack to the IAB node 300-2 or the UE 100-3. FIG. 13 is a sequence diagram illustrating another operation example according to the present embodiment. Here, the difference from the operation example of FIG. 12 will be described.

As illustrated in FIG. 13, in the present operation example, the adaptation entity 23 is located in a layer lower than the RLC entity 22. In the configuration, for example, the adaptation entity 23 performs QoS control, distinguishes and associates UL reception from the UE 100 and UL reception from the IAB node, and provides an instruction to the MAC. The RLC entity 22 is separated into an ARQ function (RLC ARQ) and a data segmentation and concatenation function (RLC Seg.) in the IAB nodes 300-1 and 300-2 and the gNB 200-1.

As illustrated in FIG. 13, in Step S31, the transmission side RLC entity 12 of the UE 100-3 receives the PDCP PDU from the PDCP entity 13 as the RLC SDU, generates the RLC PDU from the RLC SDU, and transmits the generated RLC PDU to the IAB node 300-2 via the MAC entity 11. The reception side RLC entity 22R of the IAB node 300-2 receives the RLC PDU via the MAC entity 21R and an adaptation entity 23R.

In Step S32, by starting the timer in response to reception of the RLC PDU, the reception side RLC entity 22R of the IAB node 300-2 counts the waiting time until a transmission side RLC entity (RLC ARQ) 22Tb of the IAB node 300-2 receives the Ack.

In Step S33, the reception side RLC entity 22R of the IAB node 300-2 relays the RLC SDU corresponding to the RLC PDU received in Step S32 to the transmission side RLC entity (RLC ARQ) 22Tb.

In Step S34, the transmission side RLC entity (RLC ARQ) 22Tb of the IAB node 300-2 transmits the RLC SDU received from the reception side RLC entity 22R to the IAB node 300-1 via a transmission side RLC entity (RLC Seg.) 22Ta, an adaptation entity 23T, and the MAC entity 21T. Here, the transmission side RLC entity (RLC Seg.) 22Ta provide the sequence number to the RLC SDU and segments the RLC SDU. The reception side RLC entity (RLC Seg.) 22Ra of the IAB node 300-1 receives the RLC PDU via the MAC entity 21R and the adaptation entity 23R, and relays the RLC PDU to the transmission side RLC entity (RLC Seg.) 22Ta. The transmission side RLC entity (RLC Seg.) 22Ta of the IAB node 300-1 segments the relayed RLC SDU (PDCP PDU), and transmits the RLC SDU (PDCP PDU) to the gNB 200-1 via the adaptation entity 23T and the MAC entity 21T. Note that, from the viewpoint of the ARQ, the IAB node 300-1 is transparent. A reception side RLC entity (RLC ARQ) 32b of the gNB 200-1 receives the RLC PDU via the MAC entity 31, the adaptation entity 33, and a reception side RLC entity (RLC Seg.) 32a. The reception side RLC entity (RLC ARQ) 32b of the gNB 200-1 provides the RLC SDU corresponding to the received RLC PDU to the PDCP entity 34.

In Step S35, the reception side RLC entity (RLC ARQ) 32b of the gNB 200-1 transmits the STATUS PDU including the Ack corresponding to the RLC PDU received in Step S34 to the IAB node 300-1 via the reception side RLC entity (RLC Seg.) 32a, the adaptation entity 33, and the MAC entity 31. The STATUS PDU may include the Nack corresponding to other RLC PDUs. The STATUS PDU is transmitted to the IAB node 300-2 via the IAB node 300-1. The transmission side RLC entity (RLC ARQ) 22Tb of the IAB node 300-2 receives the STATUS PDU via the MAC entity 21T, the adaptation entity 23T, and the transmission side RLC entity (RLC Seg.) 22Ta.

In Step S36, the transmission side RLC entity (RLC ARQ) 22Tb of the IAB node 300-2 provides the received STATUS PDU or transmission acknowledgment information based on the received STATUS PDU to the reception side RLC entity 22R of the IAB node 300-2.

In Step S37, the reception side RLC entity 22R of the IAB node 300-2 confirms that the transmission side RLC entity (RLC ARQ) 22Tb of the IAB node 300-2 has received the Ack corresponding to the RLC PDU received in Step S31, based on the transmission acknowledgment information.

In Step S38, the reception side RLC entity 22R of the IAB node 300-2 transmits the STATUS PDU including the Ack corresponding to the RLC PDU received in Step S31 to the UE 100-3 via the adaptation entity 23R and the MAC entity 21R. The transmission side RLC entity 12 of the UE 100-3 receives the STATUS PDU via the MAC entity 11, confirms transmission success of the RLC PDU transmitted in Step S31, and reports this to the PDCP entity 13.

Note that, in the operation example of FIG. 13, for example, the gNB 200-1 may refer to a routing table, identify the IAB node 300-2 that provides the access link for the UE 100-3, and transmit an ACK/NACK that is different from the usual ACK/NACK (STATUS PDU) to the IAB node 300-2. Here, the different ACK/NACK may be used for collectively transmitting ACK/NACKs of a plurality of (backhaul) bearers with one message. In that case, the gNB 200-1 may associate (list up) IDs for identifying the bearers (or RLC channels) and ACK/NACK information and transmit the associated information. The gNB 200-1 may transmit such a different ACK/NACK in response to a request from the IAB node 300-2.

In this manner, according to the present embodiment, when the ARQ is performed using in a "hop-by-hop" manner, even when data misses on the data transfer path, retransmission in the PDCP layer can be performed. There is consistency with the current PDCP operation, and thus the current PDCP operation need not be changed. Specifically, by minimizing operation change of the UE 100, backward compatibility can be maintained. In addition, each IAB node 300 only needs to take an ACK reception situation of a relay destination into consideration, and thus complexity and increase of processing can be prevented.

Modification Example 1 of Second Embodiment

Regarding Modification Example 1 of the second embodiment, the difference from the second embodiment described above will mainly be described. The present modification example may be carried out together with the second embodiment described above, or may be carried out separately from the second embodiment described above.

In the present modification example, uplink data transfer will mainly be described. Note that the data transfer may be downlink data transfer, not limited to uplink data transfer.

When the IAB node 300 according to the present modification example relays data from the first communication apparatus to the second communication apparatus, the IAB node 300 stores the data. The first communication apparatus may be the UE 100, or may be another IAB node being interposed between the UE 100 and the IAB node 300. The second communication apparatus may be the gNB 200, or may be another IAB node being interposed between the gNB 200 and the IAB node 300. The IAB node 300 transmits the stored data to the third communication apparatus, in response to deterioration of the radio state in the radio link with the second communication apparatus or switch of the data transfer path.

Figure 14:
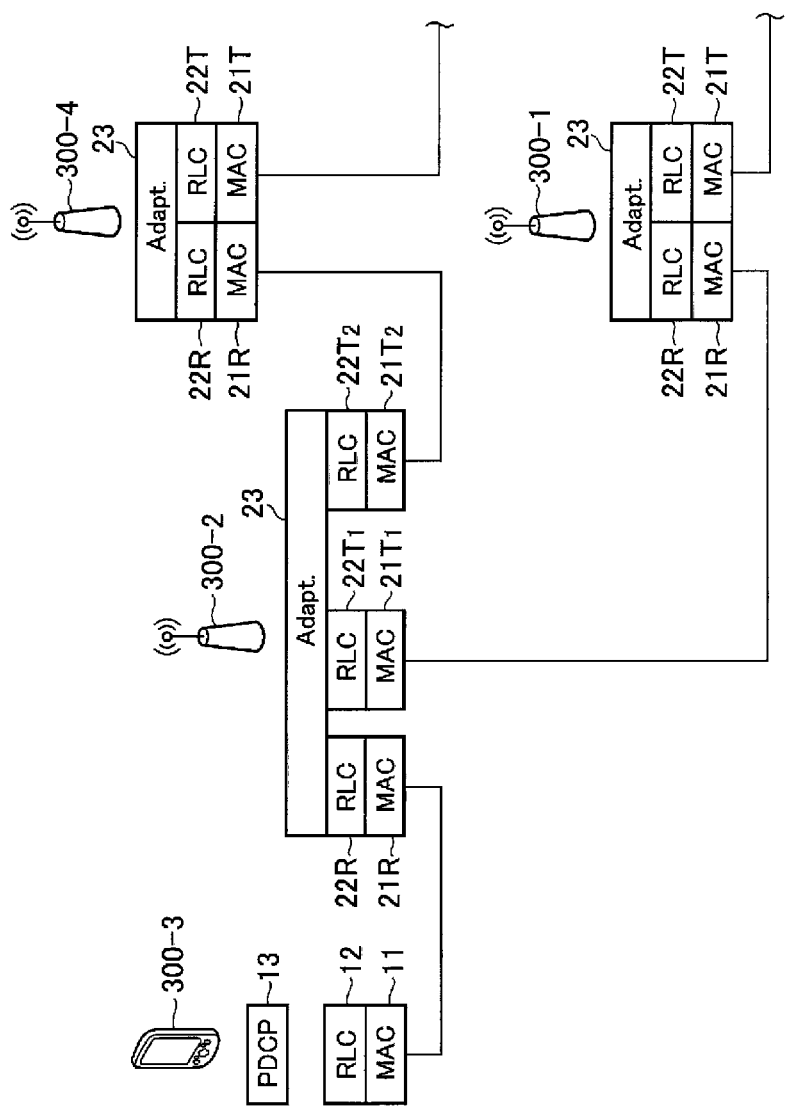
FIG. 14 is a diagram illustrating Modification Example 1 of the second embodiment.

FIG. 14 is a diagram illustrating a configuration example according to the present modification example.

As illustrated in FIG. 14, the IAB node 300-2 includes a reception side RLC entity 22R that receives data from the first communication apparatus, a first transmission side RLC entity 22T1 associated with the second communication apparatus, and a second transmission side RLC entity $22T_2$ associated with the third communication apparatus. In the example of FIG. 14, the first communication apparatus is the UE 100-3, the second communication apparatus is the IAB node 300-1, and the third communication apparatus is an IAB node 300-4.

The IAB node 300-2 includes an adaptation entity 23 that provides the data received by the reception side RLC entity 22R to the first transmission side RLC entity $22T_1$ and that stores (buffers) the data. The adaptation entity 23 is located in a layer higher than the RLC entity 22.

The adaptation entity 23 of the IAB node 300-2 provides the stored data to the second transmission side RLC entity $22T_2$, in response to deterioration of the radio state between the IAB node 300-2 and the second communication apparatus (IAB node 300-1), or switch of the data transfer path from the second communication apparatus (IAB node 300-1) to the third communication apparatus (IAB node 300-4). Here, the deterioration of the radio state may be occurrence of a radio link failure with the second communication apparatus, interruption of the radio signal from the second communication apparatus, or dropping of a reception level of the radio signal from the second communication apparatus below a threshold. The switch of the data transfer path may be change of a network topology due to handover.

For example, the adaptation entity 23 buffers the PDCP PDU (RLC SDU) that has been delivered to the transmission side RLC entity $22T_1$, and when a failure occurs in the radio link associated with the transmission side RLC entity $22T_1$, delivers the buffered PDCP PDU to the transmission side RLC entity $22T_2$ associated with another radio link. In this manner, even when the radio link failure occurs, missing of data can be prevented.

Specifically, the adaptation entity 23 of the IAB node 300-2 acquires the RLC SDU from the reception side RLC entity 22R, creates a copy of the RLC SDU (PDCP PDU), stores one RLC SDU (PDCP PDU) in its own buffer, and then delivers another RLC SDU (PDCP PDU) to the first transmission side RLC entity $22T_1$. Then, when a radio link anomaly occurs, the adaptation entity 23 of the IAB node 300-2 extracts the stored RLC SDU (PDCP PDU) from the buffer, and delivers the RLC SDU (PDCP PDU) to the second transmission side RLC entity $22T_2$ in which a radio link anomaly does not occur. Here, the radio link anomaly may be reported from the RRC of the IAB node 300-2, or may be reported from the RRC of the gNB (donor gNB) 200. Alternatively, the reception side RLC entity 22R of the IAB node 300-2 may deliver the copy from the RLC SDU to the second transmission side RLC entity $22T_2$. The transmission side RLC entity being a switch destination may be specified by the RRC of the IAB node 300-2, or may be specified by the RRC of the gNB (donor gNB) 200.

The adaptation entity 23 of the IAB node 300-2 starts a timer when the adaptation entity 23 stores the RLC SDU (PDCP PDU), and discards the RLC SDU (PDCP PDU) when the timer expires. Alternatively, the adaptation entity 23 of the IAB node 300-2 may acquire transmission confirmation information (Ack/Nack) from the adaptation entity of the gNB (donor gNB) 200 or the adaptation entity of another IAB node, and discard the RLC SDU (PDCP PDU) when the adaptation entity 23 determines that transmission of the stored RLC SDU (PDCP PDU) has succeeded. When the adaptation entity 23 of the IAB node 300-2 discards the RLC SDU (PDCP PDU), the adaptation entity 23 may stop the timer. The adaptation entity 23 of the IAB node 300-2 may exclude the RLC SDU (PDCP PDU) from the retransmission targets using PDCP Data Recovery, instead of discarding the RLC SDU (PDCP PDU).

The adaptation entity 23 of the IAB node 300-2 may discard the RLC SDU (PDCP PDU) or exclude the RLC SDU (PDCP PDU) from the retransmission targets using PDCP Data Recovery in response to the second transmission side RLC entity $22T_2$ receiving the STATUS PDU (Ack/Nack) or the transmission confirmation information (Ack/Nack) from the reception side RLC entity 22R of the IAB node 300-4 and the adaptation entity 23 acquiring those pieces of information from the second transmission side RLC entity 22T₂.

Note that, in FIGS. 12 to 14, the PHY entity of each apparatus (the UE, the IAB node, the gNB) is omitted. However, in actuality, each apparatus may include the PHY entity, and may communicate with each other via each PHY entity.

Modification Example 2 of Second Embodiment

Regarding Modification Example 2 of the second embodiment, the difference from the second embodiment and Modification Example 1 thereof described above will mainly be described. The present modification example may be carried out together with the second embodiment and Modification Example 1 thereof described above, or may be carried out separately from the second embodiment and Modification Example 1 thereof described above.

Figure 15:
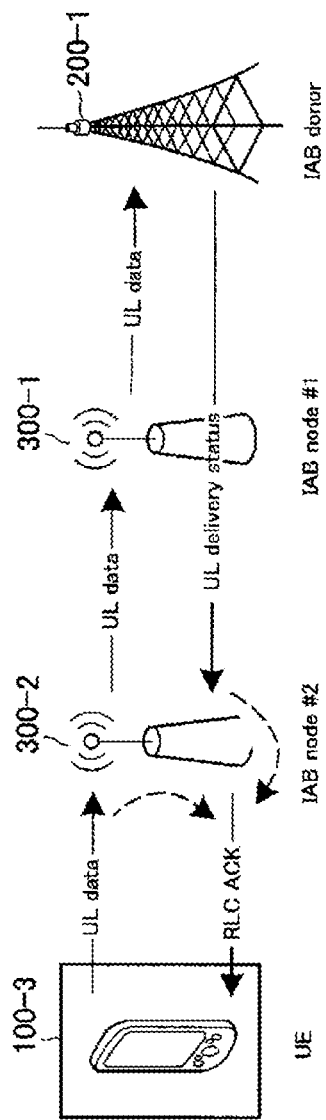
FIG. 15 is a diagram illustrating an assumed scenario of Modification Example 2 of the second embodiment.

FIG. 15 is a diagram illustrating an assumed scenario of Modification Example 2 of the second embodiment.

As illustrated in FIG. 15, the IAB node 300-1 (IAB node #1) and the IAB node 300-2 (IAB node #2) are interposed between the donor gNB (IAB donor) 200-1 and the UE 100-3. Each of the IAB node 300-1 (IAB node #1) and the IAB node 300-2 (IAB node #2) relays the uplink data (UL data) transmitted from the UE 100 to the donor gNB 200-1.

The donor gNB 200-1 transmits, via the IAB node 300-1, the transmission acknowledgment information (UL delivery status) indicating a transmission situation of the uplink data to the IAB node 300-2 to which the UE 100 is connected. When the IAB node 300-2 confirms that the donor gNB 200-1 has correctly received the uplink data, based on the transmission confirmation, the IAB node 300-2 transmits the ACK (RLC ACK) corresponding to the uplink data to the UE 100.

Here, the IAB node 300-2 includes a transmission side RLC entity that transmits the uplink data to the IAB node 300-1, and the transmission side RLC entity performs window control for performing order control and duplicate control.

The transmission side RLC entity of the IAB node 300-2 provides the sequence number (SN) every time of transmission of a new RLC PDU, and transmits the RLC PDU including the SN to the reception side RLC entity of the IAB node 300-1. The transmission side RLC entity of the IAB node 300-2 stores the transmitted RLC PDU in a buffer, and discards it after confirming transmission success based on a Status report (ACK) from the reception side.

Here, the transmission side RLC entity of the IAB node 300-2 manages an RLC transmission window. The transmission side RLC entity of the IAB node 300-2 retransmits the RLC PDU the ACK of which is not confirmed, and slides the RLC transmission window sequentially.

When the transmission side RLC entity of the IAB node 300-2 cannot confirm the ACK and cannot update the RLC transmission window, the transmission side RLC entity can no longer transmit a new PDU, and throughput is deteriorated. Such a phenomenon may be referred to as Tx Window Stalling. In order to avoid Tx Window Stalling, it is necessary to feed back the Status report from the reception side at appropriate intervals.

In the present modification example, in order to transmit the transmission acknowledgment information (UL delivery status) from the donor gNB 200-1 to the IAB node 300-2, the upper entity performs exchange of the transmission acknowledgment information. The upper entity refers to an entity of a layer higher than the RLC entity. For example, the upper layer may be an adaptation layer (Adapt), or may be an F1-AP being an entity for the F1 interface. In order for the IAB node 300-2 and the donor gNB 200-1 to perform direct exchange, a routing function of multi-hop is necessary; however, the RLC can only perform one-on-one (one-to-one) exchange, and thus an upper layer is used.

Here, when the upper layer of the IAB node 300-2 exchanges the transmission acknowledgment information (UL delivery status), and the transmission side RLC entity of the IAB node 300-2 manages the RLC transmission window, appropriate cooperation between the upper layer and the transmission side RLC entity is necessary in the IAB node 300-2.

Figure 16:
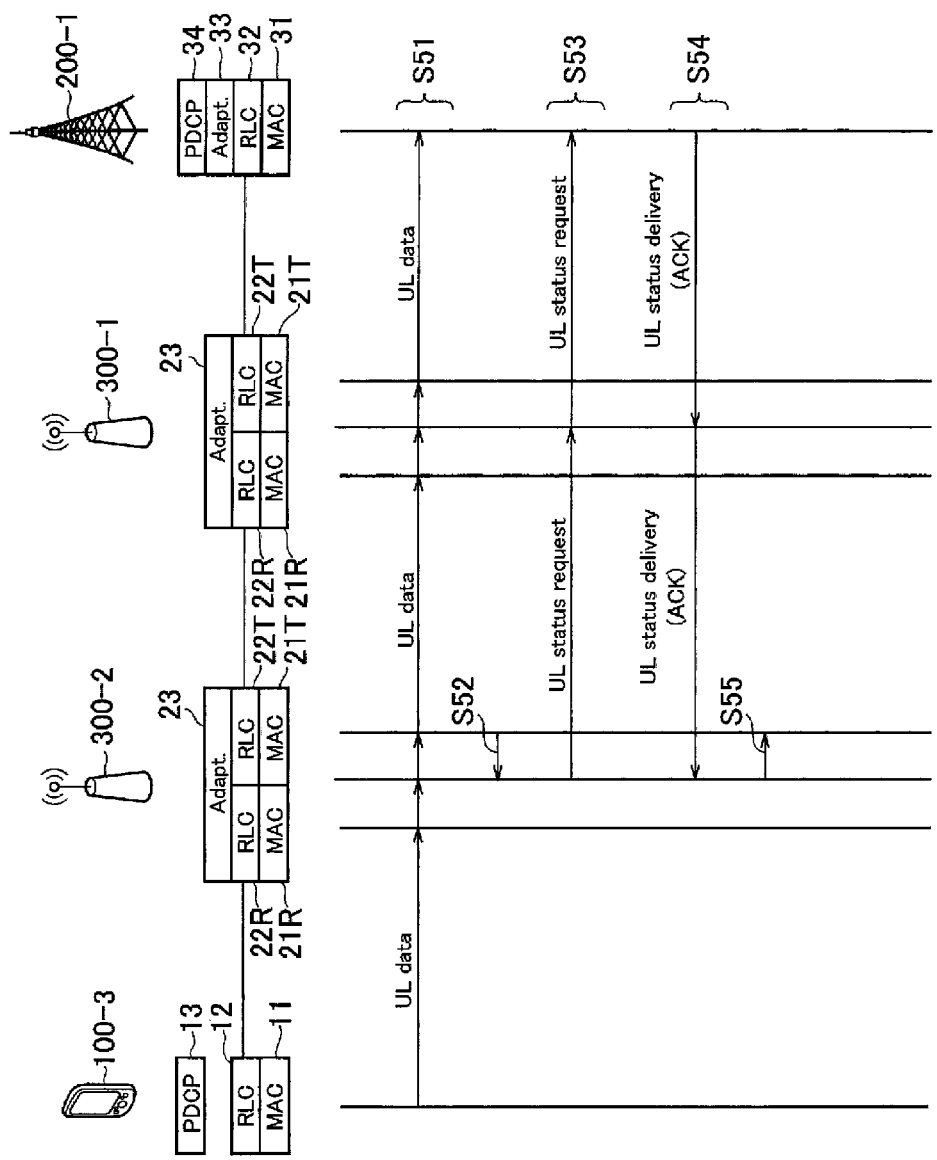
FIG. 16 is a diagram illustrating operation according to Modification Example 2 of the second embodiment.

FIG. 16 is a diagram illustrating operation according to the present modification example. The configuration of the protocol stack illustrated in FIG. 16 is similar to the configuration of the protocol stack illustrated in FIG. 12. Note that FIG. 16 illustrates an example in which the upper layer is the adaptation layer (adaptation entity). However, the upper layer may be the F1-AP (F1-AP entity).

As illustrated in FIG. 16, in Step S51, the transmission side RLC entity 12 of the UE 100-3 receives the uplink data (PDCP PDU) from the PDCP entity 13 as the RLC SDU, generates the RLC PDU from the RLC SDU, and transmits the generated RLC PDU to the IAB node 300-2 via the MAC entity 11. The reception side RLC entity 22R of the IAB node 300-2 receives the RLC PDU via the MAC entity 21R.

The reception side RLC entity 22R of the IAB node 300-2 provides the RLC SDU to the transmission side RLC entity 22T of the IAB node 300-2 via the adaptation entity 23 of the IAB node 300-2. The transmission side RLC entity 22T of the IAB node 300-2 generates the RLC PDU from the RLC SDU received from the adaptation entity 23, and transmits the generated RLC PDU to the IAB node 300-1 via the MAC entity 21. The reception side RLC entity 22R of the IAB node 300-1 receives the RLC PDU via the MAC entity 21R.

The IAB node 300-1 performs operation similar to the operation performed by the IAB node 300-2, and transmits the RLC PDU to the donor gNB 200-1.

The donor gNB 200-1 processes the uplink data in the order of the MAC entity 31, the RLC entity 32, the adaptation entity 33, and the PDCP entity.

In Step S52, the transmission side RLC entity 22T of the IAB node 300-2 performs a transmission confirmation request of uplink data to the adaptation entity 23 so that stalling of its own RLC transmission window does not occur.

Specifically, the transmission side RLC entity 22T performs the transmission confirmation request of the uplink data to the adaptation entity 23 before the oldest sequence number the ACK of which cannot be confirmed reaches (the lower-limit value of) a range of the sequence number corresponding to the RLC transmission window. The transmission side RLC entity 22T may include the sequence number being a target of the transmission confirmation in the transmission confirmation request. The sequence number may be an RLC sequence number provided by the transmission side RLC entity 22T, or may be a sequence number (packet identification number) provided by the adaptation entity 23.

In Step S53, the adaptation entity 23 of the IAB node 300-2 transmits a transmission request (UL status request) of requesting transmission of transmission acknowledgment information (UL status delivery) corresponding to the uplink data to the adaptation entity 33 of the donor gNB 200 in response to the request from the transmission side RLC entity 22T (Step S52).

The adaptation entity 23 of the IAB node 300-2 may include the sequence number being a target of the transmission confirmation in the transmission request (UL status request). The sequence number may be an RLC sequence number provided by the transmission side RLC entity 22T, or may be a sequence number (packet identification number) provided by the adaptation entity 23.

In Step S54, the adaptation entity 33 of the donor gNB 200-1 transmits the transmission acknowledgment information (UL status delivery) to the adaptation entity 23 of the IAB node 300-2, in response to reception of the transmission request (UL status request).

In Step S55, the adaptation entity 23 of the IAB node 300-2 performs a transmission confirmation response of the uplink data to the transmission side RLC entity 22T, in response to reception of the transmission acknowledgment information (UL status delivery). The response may include an RLC SN of the packet the transmission of which has been confirmed, or an SN (packet identification number) of the adaptation entity 23.

The transmission side RLC entity 22T of the IAB node 300-2 slides the RLC transmission window in response to the response from the adaptation entity 23.

Note that, as a method of transmitting the ACK to the UE 100 side, a method similar to that of the second embodiment described above may be used.

According to the present modification example, the upper layer (adaptation entity 23) of the IAB node 300-2 receives the transmission acknowledgment information (UL status delivery) from the donor gNB 200-1 and reports information related to the transmission acknowledgment information from the adaptation entity 23 to the transmission side RLC entity 22T, so that occurrence of Tx Window Stalling in the transmission side RLC entity 22T can be reduced.

The operation example illustrated in FIG. 16 is an example in which the IAB node 300-2 receives the transmission acknowledgment information (UL status delivery) of the donor gNB 200-1 and slides the RLC transmission window. However, the operation example is not limited thereto. The transmission acknowledgment information (UL status delivery) is transmitted via the routing function of the adaptation entity 23 of the IAB node 300-1, and can thus be decoded in the IAB node 300-1 as well. Similarly to the operation of the IAB node 300-2, the RLC transmission window can be slid in the IAB node 300-1 as well. In other words, the adaptation entity 23 of the IAB node 300-1 decodes the information even when the transmission destination of the transmission acknowledgment information (UL status delivery) is not the IAB node 300-1 itself, and provides the transmission confirmation information to the RLC entity 22T of the IAB node 300-1. In this manner, the RLC entity 22T can slide the RLC transmission window. The method as described above eliminates the need of exchanging the transmission confirmation request and the transmission acknowledgment information separate for each IAB node, and a signaling load in the network can be reduced.

Modification Example 3 of Second Embodiment

Regarding Modification Example 3 of the second embodiment, the difference between the second embodiment and Modification Examples 1 and 2 thereof described above will mainly be described. The present modification example may be carried out together with the second embodiment and Modification Examples 1 and 2 thereof described above, or may be carried out separately from the second embodiment and Modification Examples 1 and 2 thereof described above.

Figure 17:
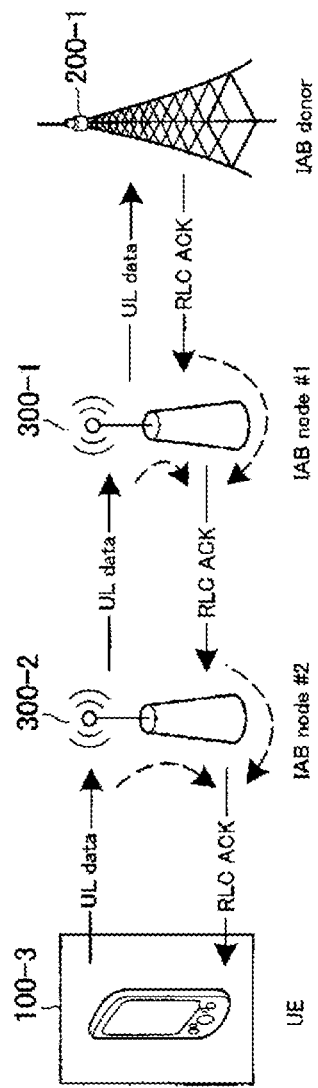
FIG. 17 is a diagram illustrating an assumed scenario of Modification Example 3 of the second embodiment.

FIG. 17 is a diagram illustrating an assumed scenario of Modification Example 3 of the second embodiment. Note that the assumed scenario of Modification Example 3 of the second embodiment is similar to FIG. 11 and FIG. 12 of the second embodiment described above.

As illustrated in FIG. 17, the IAB node 300-1 (IAB node #1) and the IAB node 300-2 (IAB node #2) are interposed between the donor gNB (IAB donor) 200-1 and the UE 100-3. Each of the IAB node 300-1 (IAB node #1) and the IAB node 300-2 (IAB node #2) relays the uplink data (UL data) transmitted from the UE 100 to the donor gNB 200-1.

The donor gNB 200-1 transmits the RLC ACK to the IAB node 300-1, the IAB node 300-1 transmits the RLC ACK to the IAB node 300-2, and the IAB node 300-2 transmits the RLC ACK to the UE 100. In this manner, when the RLC ACK is sequentially transmitted from the upper side to the lower side, delay of the RLC ACK is increased. As a result, Tx Window Stalling may occur in the transmission side RLC entity of the lower apparatus (the UE 100 and the IAB node 300-2).

In view of this, in the present modification example, the donor gNB 200-1 performs configuration related to the RLC transmission window by taking such delay into consideration.

Figure 18:
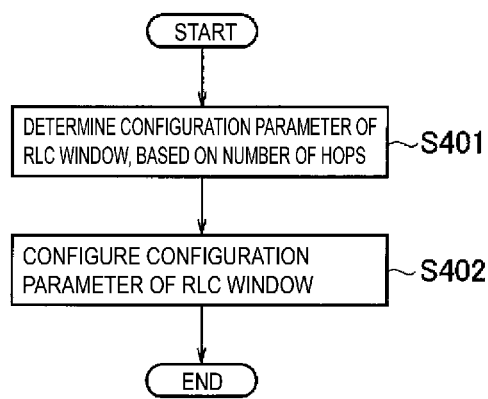
FIG. 18 is a diagram illustrating operation according to Modification Example 3 of the second embodiment.

FIG. 18 is a diagram illustrating operation according to Modification Example 3 of the second embodiment.

As illustrated in FIG. 18, in Step S401, the donor gNB 200 determines a configuration parameter related to an RLC window, based on the number of hops indicating the number of IAB nodes 300 being interposed between the UE 100 and the donor gNB 200. Here, the donor gNB 200 manages each IAB node 300 under the donor gNB 200, and knows the number of hops.

The configuration parameter related to the RLC window includes, for example, at least one of length of the RLC transmission window managed by the transmission side RLC entity, a timer (t-StatusProhibit) defining time in which transmission of an RLC Status Report (STATUS PDU) from the reception side RLC entity to the transmission side RLC entity is prohibited, or a threshold (pol1PDU, pollByte) of a data amount or the number of PDUs being used as a trigger for requesting transmission of the RLC Status Report (STATUS PDU) from the transmission side RLC entity to the reception side RLC entity.

The donor gNB 200 may determine to increase the RLC transmission window as the number of hops is larger. The donor gNB 200 may determine to reduce the value of t-StatusProhibit as the number of hops is larger. The donor gNB 200 may determine to reduce the threshold of the data amount or the number of PDUs as the number of hops is larger.

In Step S402, the donor gNB 200 configures the configuration parameter determined in Step S401 to at least one of the UE 100 or the IAB node 300. Specifically, the donor gNB 200 transmits the configuration message including the configuration parameter determined in Step S401 to at least one of the UE 100 or the IAB node 300.

According to the present modification example, the donor gNB 200 determines the configuration parameter related to the RLC window taking the number of hops into consideration, which thus can reduce occurrence of Tx Window Stalling in the transmission side RLC entity.

Modification Example 4 of Second Embodiment

Regarding Modification Example 4 of the second embodiment, the difference from the second embodiment and Modification Examples 1 to 3 thereof described above will mainly be described. The present modification example may be carried out together with the second embodiment and Modification Examples 1 to 3 thereof described above, or may be carried out separately from the second embodiment and Modification Examples 1 to 3 thereof described above.

An assumed scenario of Modification Example 4 of the second embodiment is similar to that of Modification Example 3 of the second embodiment (see FIG. 17).

The present modification example relates to operation in which the transmission side RLC entity of the IAB node 300 transmits polling for requesting transmission of the RLC Status Report (STATUS PDU) indicating the ACK/NACK to an upper apparatus. Note that the upper apparatus is the donor gNB 200, or another IAB node being interposed between the donor gNB 200 and the IAB node 300.

Figure 19:
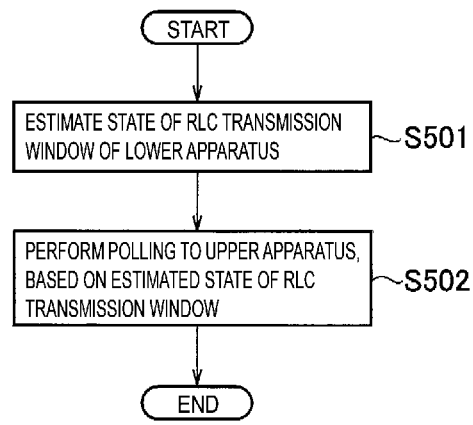
FIG. 19 is a diagram illustrating operation according to Modification Example 4 of the second embodiment.

FIG. 19 is a diagram illustrating operation according to Modification Example 4 of the second embodiment. Here, the IAB node 300-2 illustrated in FIG. 17 will be described as an example.

As illustrated in FIG. 19, in Step S501, the IAB node 300-2 estimates a state of the RLC transmission window of the UE 100 being a lower apparatus of the IAB node 300-2. For example, the IAB node 300-2 estimates the state of the RLC transmission window of the UE 100, based on RLC transmission window configuration of the UE 100, a buffer status report (BSR) from the UE 100, information (UL grant) of the uplink resources allocated to the UE 100, and the like. Here, the IAB node 300-2 may receive the RLC configuration of the UE 100 being a lower apparatus of the IAB node 300-2 from the IAB donor (donor gNB 200-1).

In particular, the IAB node 300-2 estimates whether or not Tx Window Stalling has occurred in the UE 100. The IAB node 300-2 may predict future timing at which Tx Window Stalling will occur in the UE 100.

In Step S502, the IAB node 300-2 transmits polling to the IAB node 300-1, based on the state of the RLC transmission window estimated in Step S501. For example, when the IAB node 300-2 estimates that Tx Window Stalling has occurred or Tx Window Stalling will occur in the UE 100 not before long, the IAB node 300-2 transmits the polling to the IAB node 300-1.

In this manner, the IAB node 300-2 can acquire the RLC ACK/NACK from the IAB node 300-1 at appropriate timing, and can thus transmit the RLC ACK/NACK to the UE 100 immediately when the IAB node 300-2 receives the polling from the UE 100.

Third Embodiment

Regarding a third embodiment, the difference from the first embodiment and the second embodiment described above will mainly be described. The present embodiment may be carried out together with the first embodiment and the second embodiment described above, or may be carried out separately from the first embodiment and the second embodiment described above.

When a lower apparatus immediately under the IAB node 300 detects a radio link failure (RLF) with the IAB node 300, the lower apparatus reselects another cell, and attempts reestablishment of connection with the reselected cell. However, because the RLF is basically detected based on a downlink reception state, the IAB node 300 may not be able to know that the lower apparatus has detected the RLF.

Figure 20:
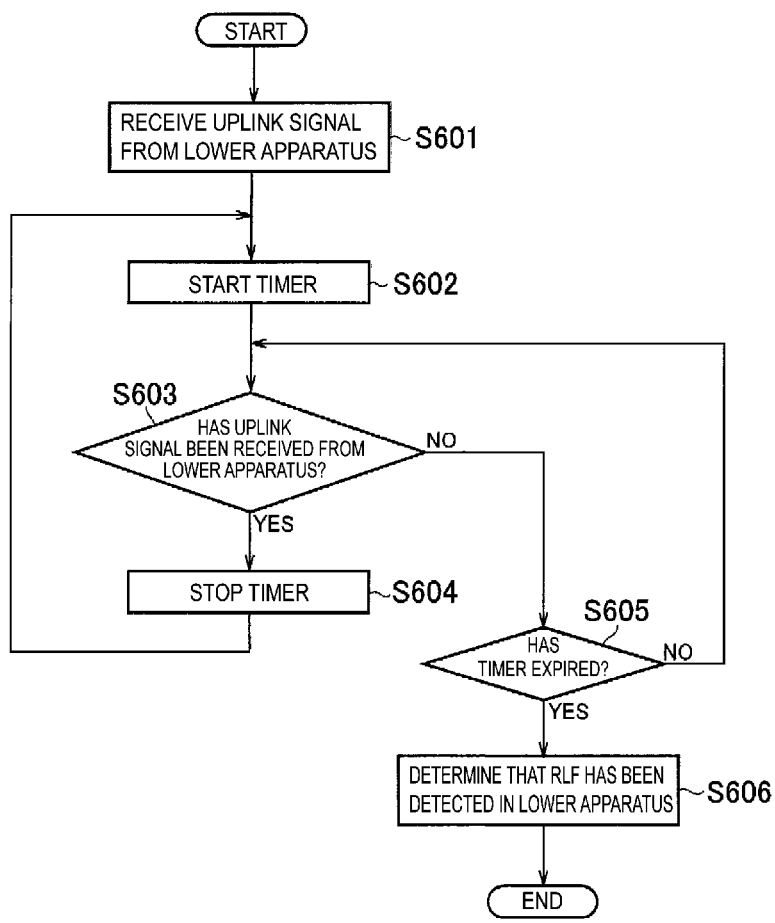
FIG. 20 is a diagram illustrating operation of an IAB node according to a third embodiment.

FIG. 20 is a diagram illustrating operation of the IAB node 300 according to the third embodiment.

As illustrated in FIG. 20, in Step S601, the IAB node 300 receives an uplink signal periodically transmitted from the lower apparatus immediately under the IAB node 300. The lower apparatus refers to the UE 100, or another IAB node being interposed between the UE 100 and the IAB node 300. Although the uplink signal may be any type of signal as long as the signal can be periodically transmitted, for example, a MAC CE (for example, a buffer status report), an RRC message (for example, a measurement report message), and an uplink reference signal can be used.

In Step S602, the IAB node 300 starts a timer in response of reception of the uplink signal from the lower apparatus. A timer value configured in the timer may be a value configured from the donor gNB 200-1. The timer value may be time longer than an interval at which the lower apparatus transmits the uplink signal.

After starting the timer, when the IAB node 300 receives the uplink signal from the lower apparatus (Step S603: YES), in Step S604, the IAB node 300 stops the timer. In this case, the processing returns to Step S602, and the timer is restarted.

In contrast, when the IAB node 300 does not receive the uplink signal from the lower apparatus (Step S603: NO), and the timer expires (Step S605: YES), the IAB node 300 determines that the lower apparatus has detected the RLF in Step S606. When the IAB node 300 determines that the lower apparatus of the IAB node 300 has detected the RLF, the IAB node 300 may request an upper apparatus of the IAB node 300 to release a radio bearer (backhaul link) corresponding to the lower apparatus.

According to the third embodiment, the IAB node 300 can know that the RLF is detected in the lower apparatus.

Fourth Embodiment

Regarding a fourth embodiment, the difference from the first embodiment to the third embodiment described above will mainly be described. The present embodiment may be carried out together with the first embodiment to the third embodiment described above, or may be carried out separately from the first embodiment to the third embodiment described above.

Figure 21:
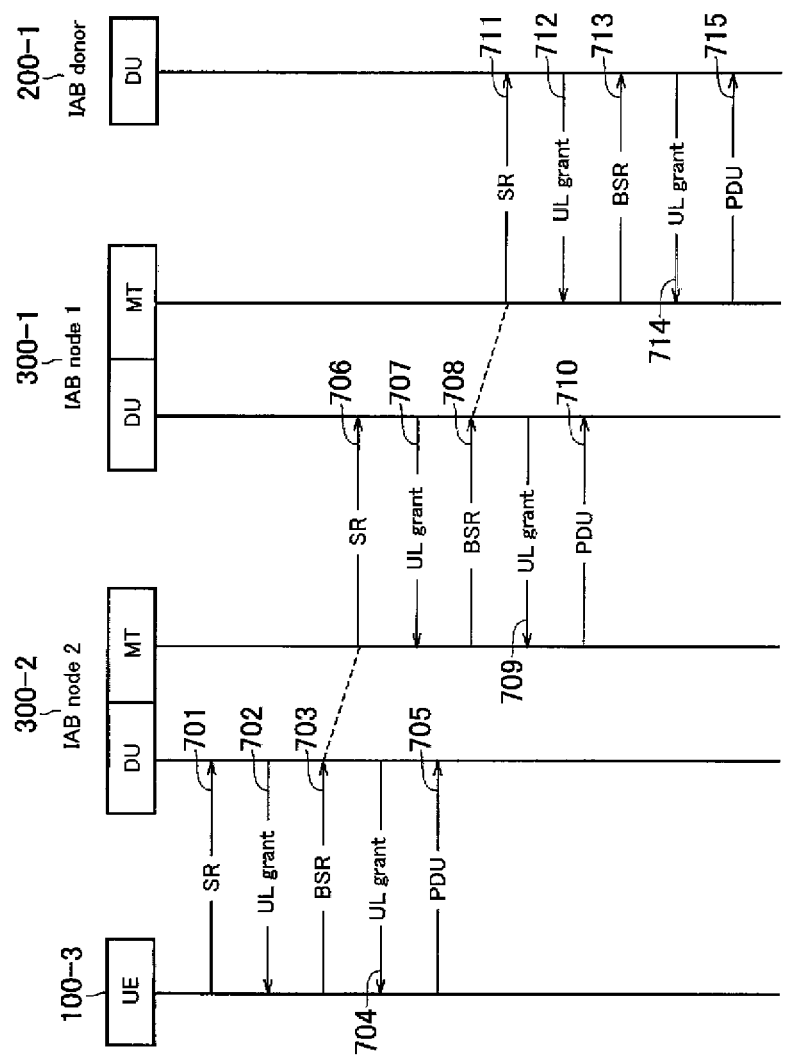
FIG. 21 is a diagram illustrating operation according to a fourth embodiment.

FIG. 21 is a diagram illustrating operation according to the fourth embodiment. In FIG. 21, "DU" corresponds to the base station function, and "MT" corresponds to the user equipment function.

As illustrated in FIG. 21, the UE 100-3 transmits uplink data (PDU) to the IAB node 300-2 through the procedure of Steps S701 to S705. Specifically, the UE 100-3 transmits a scheduling request (SR) to the IAB node 300-2 (Step S701), receives allocation of uplink radio resources for BSR transmission (Step S702), transmits a BSR (Step S703), receives allocation of uplink radio resources for uplink data transmission (Step S704), and transmits uplink data to the IAB node 300-2 (Step S705).

Similarly, the IAB node 300-2 transmits uplink data (PDU) to the IAB node 300-1 through the procedure of Steps S706 to S710.

The IAB node 300-1 transmits uplink data (PDU) to the donor gNB 200-1 through the procedure of Steps S711 to S715.

In the present sequence, each IAB node 300 receives the first scheduling request of requesting allocation of uplink radio resources from the lower apparatus. Then, each IAB node 300 transmits the second scheduling request to the upper apparatus before receiving the uplink data (PDU) from the lower apparatus.

Generally, the scheduling request is triggered when there is uplink data that ought to be transmitted; however, in the present embodiment, the scheduling request is triggered at a phase where there is not the uplink data that ought to be transmitted yet. In this manner, smooth allocation of uplink radio resources can be implemented.

For example, when the IAB node 300-2 receives the BSR from the UE 100-3 (Step S703), the IAB node 300-2 transmits the scheduling request to the IAB node 300-1 in Step S706.

After the IAB node 300-2 receives the scheduling request from the UE 100-3 (Step S701), the IAB node 300-2 may transmit the scheduling request to the IAB node 300-1 before receiving the BSR from the UE 100-3 (Step S703).

After the IAB node 300-2 receives the scheduling request from the UE 100-3 (Step S701), when the IAB node 300-2 allocates the uplink radio resources to the UE 100-3 (Step S702), the IAB node 300-2 may transmit (trigger) the scheduling request to the IAB node 300-1.

When the IAB node 300-2 receives the scheduling request from the UE 100-3 (Step S701), the IAB node 300-2 may transmit (trigger) the scheduling request to the IAB node 300-1.

In the present embodiment, each IAB node 300 transmits, to the upper apparatus, the first buffer status report at least indicating the amount of data that the IAB node 300 can use for uplink transmission. Here, the upper apparatus refers to another IAB node (upper IAB node) under the donor gNB 200, or the donor gNB 200. The upper apparatus allocates radio resources for uplink transmission to the IAB node 300, based on the first buffer status report.

The IAB node 300 includes an uplink buffer that temporarily stores pending data to be transmitted in the uplink. For example, the MAC layer of the IAB node 300 reports the first buffer status including information indicating the data amount in the uplink buffer to the MAC layer of the upper apparatus. The MAC layer of the upper apparatus includes a scheduler, and allocates uplink radio resources to the IAB node 300, based on the first buffer status, and reports the allocation resources to the IAB node 300 via a control channel.

Here, it is conceivable that, because the IAB node 300 buffers uplink data for a plurality of pieces of UE, the IAB node 300 has an uplink buffer having capacity larger than the UE 100. Thus, the buffer status report for the IAB node may have a format different from the buffer status report for the UE. The data amount (maximum data amount) with which the buffer status report for the IAB node can be expressed may be larger than the data amount (maximum data amount) with which the buffer status report for the UE can be expressed.

The buffer status report for the IAB node may include information related to the number of pieces of UE 100 under the IAB node 300. The IAB node 300 may determine the number of pieces of UE 100 under the IAB node 300, based on the UE context, the C-RNTI, and the like, or the number of pieces of UE 100 under the IAB node 300 may be reported from the donor gNB 200. The IAB node 300 may include, in the buffer status report, the number of pieces of UE 100 that have data in their uplink buffers out of the pieces of UE 100 under the IAB node 300. In other words, the IAB node 300 may report, to the upper apparatus, information as to the uplink data of how many pieces of UE the IAB node 300 has, by using the buffer status report. Alternatively, the IAB node 300 may include, in the buffer status report, the number of pieces of UE 100 in an RRC connected state out of the pieces of UE 100 under the IAB node 300.

Regarding the buffer status report for the IAB node, not only the amount of data that is actually present in the uplink buffer of the IAB node 300 but also the buffer status report from the lower apparatus (specifically, a potential uplink data amount) may be taken into consideration. In this manner, the upper apparatus can allocate uplink radio resources to the IAB node 300 in advance taking the potential uplink data amount into consideration, and can thus reduce uplink transmission delay caused due to multi-hop.

The IAB node 300 receives, from the lower apparatus, the second buffer status report indicating the amount of data that the lower apparatus can use for uplink transmission. Based on the second buffer status report, the IAB node 300 transmits, to the upper apparatus, the first buffer status report that is based on the amount of data that the IAB node 300 can use for uplink transmission and the amount of data that the lower apparatus can use for uplink transmission. For example, the IAB node 300 may include, in the first buffer status report, a total value of the amount of data that the IAB node 300 can use for uplink transmission and the amount of data that the lower apparatus can use for uplink transmission. Alternatively, the IAB node 300 may separately include, in the first buffer status report, the first BSR value indicating the amount of data that the IAB node 300 can use for uplink transmission and the second BSR value indicating the amount of data that the lower apparatus can use for uplink transmission.

Note that the data amount that the IAB node 300 can use for uplink transmission may include the data amount of a transmission buffer (buffer of MT) of the IAB node 300, the data amount of a reception buffer (DU) of the IAB node 300, and the buffer amount of the adaptation entity.

Other Embodiments

In the embodiments described above, an example has been mainly described, in which the mobile communication system 1 is a 5G mobile communication system. However, the base station in the mobile communication system 1 may be an eNB. The core network in the mobile communication system 1 may be an Evolved Packet Core (EPC). In addition, the gNB can also be connected to the EPC, the eNB can also be connected to the SGC, and the gNB and the eNB can also be connected via an inter-base station interface (Xn interface, X2 interface).

Note that a program that causes a computer to execute each of the processing operations according to the embodiments described above may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like. A chip set including a memory that stores a program for executing each of the processing operations performed by the UE 100 and the eNB 200 and a processor that executes the program stored in the memory may be provided.

Note that the flows illustrated in each figure may be combined as appropriate.

Supplementary Note 1

1. Introduction

RAN2 AH1807 has widely discussed end-to-end reliability, in other words, comparison of "end-to-end" RLC ARQ mechanism and "hop-by-hop" RLC ARQ mechanism, and agreed to incorporate additional text into TR.

Observation on "end-to-end" ARQ and "hop-by-hop" ARQ

TABLE 1

| METRIC | HOP-BY-HOP RLC ARQ | END-TO-END RLC ARQ |
|---|---|---|
| DELIVERY WITHOUT LOSS OF UL DATA DURING TOPOLOGY CHANGE (EXAMPLE: RADIO LINK FAILURE BETWEEN IAB NODES) | IN CURRENT SPECIFICATION, WHEN IAB TOPOLOGY IS CHANGED WITHOUT ADDITIONAL FUNCTION ENHANCEMENT (EXAMPLE DESCRIBED BELOW), DELIVERY WITHOUT LOSS OF DATA CANNOT BE ENSURED. | WITH END-TO-END RLC FEEDBACK, DELIVERY WITHOUT LOSS OF DATA IS ENSURED. |

The problem of end-to-end reliability of in a case of hop-by-hop RLC ARQ can be, for example, coped with by specifying the following mechanisms.

Change of a PDCP protocol/procedure. This solution may not be able to be applied to Rel-15 UE, which implies that performance of the Rel-15 UE may be deteriorated.

Re-routing of the PDCP PDU buffered in an intermediate IAB node according to path update (information that needs to be exchanged between FFS IAB nodes).

By introducing UL status delivery (from the donor gNB to the IAB node), the IAB node can delay transmission of the RLC ACK to the UE until confirmation of reception in the donor gNB.

In the supplementary note, further investigation of the hop-by-hop RLC ARQ mechanism is discussed.

2. Discussion

The agreed TP identifies the problem in the "hop-by-hop" RLC ARQ mechanism regarding end-to-end reliability, in other words, "delivery without loss of UL data during topology change", and it also adopts three possible approaches. For reference, the approaches are cited below.

First approach: "Change of a PDCP protocol/procedure. This solution may not be able to be applied to Rel-15 UE, which implies that performance of the Rel-15 UE may be deteriorated."

Second approach: "Re-routing of the PDCP PDU buffered in an intermediate IAB node according to path update. (Information that needs to be exchanged between FFS IAB nodes)."

Third approach: "By introducing UL status delivery (from the donor gNB to the IAB node), the IAB node can delay transmission of the RLC ACK to the UE until confirmation of reception in the donor gNB."

2.1. First Approach for Hop-by-Hop ARQ with Reliability

For example, in order to perform DCP data recovery while maintaining an already transmitted PDCP PDU for a certain period, the first approach requires some "changes of a PDCP protocol/procedure." However, as is adopted in TR, it deteriorates performance of the Rel-15 UE. In addition, this may require UE that implements a Rel-16 PDCP protocol, which implies that the following requirements adopted in TR cannot be satisfied. IAB designing at least supports the following pieces of UE that are connected to the IAB node.

Rel. 15 NR UE

Legacy LTE UE, when the IAB supports a backhaul of LTE access

In this sense, it may not be a possible solution for ensuring end-to-end reliability.

Proposition 1: RAN2 ought to agree that "change of PDCP" is not a solution for the Rel -15 UE in addition to "performance of the Rel-15 UE may be deteriorated."

2.2. Second Approach for Hop-by-Hop ARQ with Reliability

The second approach introduces a new function for "re-routing of the PDCP PDU buffered in an intermediate IAB node according to path update", and it may be assumed that the function is implemented in any one of the RLC or the adaptation layer. The path update may mean a plurality of scenarios as below, for example.

Connection to a parent fails and is recovered as another connection to a different parent (in other words, RRC reestablishment). Alternatively, Connection to a parent is reconfigured so as to be changed to a different parent (in other words, handover). Alternatively, The primary connection out of two connections to different parents is switched to the other (in other words, for example, redundant routing with dual connectivity).

In some of the cases described above (for example, in a case of handover), the RLC entity may be required to be reestablished, and further, all of the RLC SDUs are discarded. Thus, unless operation of Rel-15 RLC is changed, the PDCP PDU cannot be buffered/re-routed. In contrast, it is conceivable that the adaptation layer of a type "higher than the RLC" is appropriate for buffering the PDCP PDUs during RLC reestablishment, and is appropriate for re-routing those in (another) RLC entity related to an active MAC link.

Proposition 2: RAN2 ought to agree that the function of buffering/re-routing the PDCP PDU is processed by the adaptation layer located "higher than the RLC" in the intermediate IAB node.

In consideration of these cases, "information needs to be exchanged" includes reconfiguration of the RRC, and thus, for example, this is considered to be performed between the IAB donor and the IAB node, for architecture group 1, in addition to "between the IAB nodes" already adopted for architecture group 2. In addition, for path update, for example, for the RLF, it may be already impossible to exchange information between the IAB nodes for path update. Thus, it is conceivable that TR ought not to restrict the entity of information exchange in the IAB node.

Proposition 3: RAN2 ought to agree that addition of text "or between the IAB donor and the IAB node" for information exchange being triggered by "re-routing of the PDCP PDU".

The advantage of the second approach shall be the configuration that, even when one of the RLC channels fails due to the RLF, for example, the IAB network recovers packet loss by itself. In contrast, ultimately, it may not be a perfect solution for end-to-end reliability. For example, when the intermediate IAB node for re-routing cannot obtain other connection and finally loses the PDCP PDU due to absence of appropriate neighboring IAB donors/nodes, delivery without loss of data is not ensured.

Proposition 4: RAN2 ought to agree that "re-routing of the PDCP PDU" does not ensure delivery without loss in the end and that packet loss of an intermediate RLC channel is improved/recovered as long as another path is found.

2.3. Third Approach for Hop-by-Hop ARQ with Reliability

The third approach, in other words, "introduction of UL status delivery (from the donor gNB to the IAB node)" is interesting; however, it is not clear in Contributions thus far whether any related/possible solution has been disclosed. Thus, in a research phase as well, it is worthwhile to have more detailed discussion.

At the moment, what the "UL status delivery" is has not yet been made clear; however, the purpose of this is, for example, to permit "the IAB node can delay transmission of the RLC ACK to the UE until confirmation of reception in the donor gNB" in order to buffer the PDCP PDU in the PDCP layer of the UE and enable recovery of PDCP data. Thus, influence on the Rel-15 PDCP caused by a new mechanism that may be introduced into the RLC layer of the IAB node is not anticipated at all.

Proposition 5: RAN2 ought to discuss whether or not the influence of the third approach should be restricted in the IAB network (in other words, in the IAB donor and the IAB node).

In a case of agreeing to Proposition 3, from the perspective of an edge IAB node, there are two options as described below in order to confirm status UL delivery to the IAB donor.

Option 1: With a UL delivery status report being directly transmitted from the IAB donor to the edge IAB node, the RLC ACK takes both of its own reception status and UL delivery status report into consideration.

Option 2: With the STATUS PDU (in other words, the ACK) being transmitted between the peer PLC entities as is carried out today, the RLC ACK also takes reception that has succeeded in the RLC entity of a parent node, not only that of the own node, into consideration.

Option 1 is direct interpretation of the text adopted in TR; however, there are some complexities found regarding transmission of each UL delivery status report to each edge IAB node. A new report is different from the regular RLC PDU (in other words, the STATUS PDU), and thus may bring about additional signaling overhead via a backhaul link. Option 2 is a simple substitution such as a bucket relay game of the RLC ACKs, and thus the IAB node only needs to receive an associated RLC ACK from the parent node and then transmit an existing RLC ACK. The advantage is that it does not require additional signaling and provides scalability (in other words, there is no limitation on the number of hops). The disadvantage is that the UE may wait for a longer time to receive the STATUS PDU from the IAB node; however, this is not worse than Option 1.

When both of the options, which are still in the research phase, are recognized as being beneficial, both of the options ought to be incorporated into TR.

Proposition 6: RAN2 ought to agree incorporation of the details of "UL status delivery" into TR. In particular, the IAB node takes the UL delivery status report (Option 1) from the IAB donor and the RLC ACK (Option 2) from its parent node into consideration.

Supplementary Note 2

1. Introduction

A new work item related to integrated access and backhaul has been approved. One of the purposes of the WI is to specify a multi-hop RLC ARQ mechanism with lossless delivery.

Specification of Enhancement of L2 Radio Transport:

Specification of a mechanism for enabling lossless delivery in the hop-by-hop ARQ.

In the supplementary note, the first consideration for normative work of the hop-by-hop ARQ will be discussed.

2. Discussion

In an investigation phase, multi-hop RLC ARQ is widely discussed, and finally, TR has concluded that "RAN2 researches the hop-by-hop RLC ARQ and end-to-end RLC ARQ. In Rel-16, it is recommended that only the hop-by-hop RLC ARQ be supported." Regarding the hop-by-hop RLC ARQ, the problem of lossless delivery of UL data is identified, and candidate solutions and these observations are captured in TR. The problem of end-to-end reliability in the hop-by-hop RLC ARQ can be, for example, coped with by specifying the following mechanisms.

Change of a PDCP protocol/procedure. This mechanism may deteriorate performance of the Rel-15 UE, and shall not be applied to the Rel-15 UE When PDCP data recovery/PDCP reestablishment is triggered by the RRC or a PDCP status report is received, the UE retransmits the UL data, regardless of whether success of delivery is confirmed by the RLC A new field may be included in the RRC message or the PDCP status report in order to indicate whether the UE executes UL data retransmission regardless of confirmation of delivery success by the RLC Re-routing of the PDCP PDU buffered in the intermediate IAB node according to path update The UL data is buffered in the IAB node until the IAB node receives either information related to the UL data normally delivered from the parent node to the IAB donor or an RLC positive ACK When the transfer path is (re)configured, the buffered data is retransmitted by the IAB node being a node in which the latest change of a new path is not performed, or the IAB node in which a backhaul link failure has occurred Introduction of UL status delivery (from the donor gNB to the IAB node)

One method is that an access IAB node of the UE delays transmission of the RLC positive ACK to the UE until the access IAB node receives confirmation of data reception from the IAB donor. Another method is that the IAB node delays transmission of the RLC positive ACK to a child node or the UE until the IAB node receives the RLC positive ACK from a parent node.

When PDCP data recovery/PDCP reestablishment is triggered by the RRC, the UE retransmits the UL data in a manner defined by the current specification

TABLE 2

| | CHANGE OF PDCP PROTOCOL/ PROCEDURE | RE-ROUTING OF PDCP PDU BUFFERED IN INTERMEDIATE IAB NODE | INTRODUCTION OF UL STATUS DELIVERY |
|---|---|---|---|
| APPLICABILITY TO Rel-15 UE | NO | YES | YES |
| OVERHEAD OF SIGNALING | YES NEW SIGNALING FOR TRIGGERING DATA RETRANSMISSION | YES NEW SIGNALING FOR DETERMINING WHETHER BUFFERED DATA IS DISCARDED, OR TRANSFER PATH OF DATA BUFFERED IN OLD ROUTE IS CONFIGURED | YES NEW SIGNALING FOR CONFIRMATION OF DATA RECEPTION AND/OR TRIGGERING OF DATA RETRANSMISSION |
| SUPPORT OF LOSSLESS DELIVERY OF UL DATA | YES | NO | YES |

Clearly, the third candidate of "introduction of UL status delivery" has an advantage in metrics discussed in the research phase. Thus, in the normative work of Rel-16, the third solution needs to be prioritized. Other solutions can also be studied as well, and elimination thereof is not intended.

Proposition 1: RAN2 ought to primarily study the solution based on "introduction of UL status delivery" that is identified in the lossless delivery of the UL in the hop-by-hop RLC.

When Proposition 1 is accepted, what "UL status delivery" is ought to be made clear. TR captures the following two possibilities.

"One method is that the access IAB node of the UE delays transmission of the RLC positive ACK to the UE until the access IAB node receives confirmation of data reception from the IAB node." (Option 1)

"Another method is that the IAB node delays transmission of the RLC positive ACK to a child node or the UE until the IAB node receives the RLC positive ACK from a parent node." (Option 2)

Observation 1: Two options of "UL status delivery" are identified in the research phase.

In Option 1, the IAB node directly receives the UL status delivery from the IAB donor. In consideration of the RLC STATUS PDU being transferred between peer RLC entities, due to the multi-hop function, the UL status delivery being required beyond the intermediate RLC entity (in other words, in the intermediate IAB node) shall be a problem. To bypass the RLC entity of the intermediate IAB node, a direct message (in other words, the UL status delivery) between the (access) IAB node and the IAB donor needs to be implemented in the adaptation layer (or, as another possibility, in the F1-AP) that is higher than the RLC layer and provides routing of the entire radio backhaul. Inter-layer interaction between the adaptation layer/F1-AP and the RLC layer (for example, a polling request from the RLC layer, a delivery instruction from the adaptation layer with mapping of the sequence number of the RLC data PDU, and the like) may be required.

Observation 2: The direct "UL status delivery" (Option 1) may be implemented in the adaptation layer or the F1-AP, and some inter-layer interactions are required.

In Option 2, the IAB node delays transmission of the RLC ACK to the child node until the IAB node receives a corresponding RLC ACK from the parent node. Thus, the UL status delivery can reuse the existing STATUS PDU in the RLC layer, and the message is regarded as being "implicit". Note that, when the delay of the RLC ACK becomes long in an edge device (for example, the UE and the (access) IAB node), the length of the window becomes long, t-StatusProhibit timer becomes short, or the RLC window stops unless careful operation is performed, which may deteriorate latency/throughput.

Observation 3: The implicit "UL status delivery" (Option 2) can reuse the existing RLC STATUS PDU; however, this needs to be carefully implemented in order to avoid frequent RLC window stop.

The two options of "UL status delivery" have their pros and cons. Option 2, however, is simpler, and thus causes less trouble in standardization.

Proposition 2: RAN2 ought to agree to adopt (or prioritize) the implicit "UL status delivery" that reuses the existing RLC STATUS PDU, specifically, "the IAB node delays transmission of the RLC positive ACK to its child node or the UE until the IAB node receives the RLC positive ACK from its parent node" (Option 2 in the above).

A common aspect between the options shall be that the RLC needs to have an additional condition for the RLC ACK to the UE and/or the child node, that is, a method of configuring ACK_SN with the STATUS PDU. This is because, although the RLC entity of the IAB node normally receives a related data PDU from the UE/child node in actuality, the RLC entity needs to wait for reception of "UL status delivery" from the IAB donor/parent node. A simple solution is to consider that the related data PDU has not yet been received until the RLC entity receives "UL status delivery".

Proposition 3: RAN2 ought to agree that the RLC entity considers that the related UL data PDU has not yet been received until "UL status delivery" is received when the STATUS PDU is constructed regardless of the option (in other words, direct or implicit).

Supplementary Note 3

1. Introduction

A new work item related to integrated access and backhaul has been approved. The WID defines, as one of the purposes thereof, specifying backhaul radio link failure (BH RLF) processing.

Specification of IAB Node Following Architecture 1 a Including Following

Hop-by-hop propagation of signaling for supporting low latency scheduling, BH RLF processing, and resource adjustment of the entire multi-hop topology.

Specification of Signaling of L2 Transport and Resource Management

Specification of BH RLF processing (example: downstream BH RLF indication)

In the supplementary note, the first consideration of the BH RLF processing will be discussed in addition to results from the research item.

2. Discussion

TR identifies the problem caused by the BH RLF in the radio backhaul of multi-hop in sections 9.7.14 and 9.7.15. The common problem in the sections is that the child IAB node/UE does not recognize the BH RLF in the parent IAB node. As a result, service including delay of recovery of the service is significantly interrupted from the perspective of a user. With this, the BH RLF may frequently occur in the radio backhaul of a high frequency such as FR2 and multi-hopping.

In order to avoid such a poor user experience as above, TR also identifies possible solutions as below.

9.7.14 Downstream Indication of BH RLF in Architecture 1

"Option 1: An IAB node DU stops service. As a result, the child node also determines the BH RLF, and recovers according to the procedure described above."

"Option 2: An IAB node DU explicitly warns the child IAB node about an upstream RLF. The child IAB node that has received the warning may transfer the warning to the further downstream side. Each IAB node that has received such warning starts BH-RLF recovery described above."

"Option 3: All of the IAB nodes may periodically share information related to BH quality and the like with a child or parent IAB node. In this manner, downstream or upstream RLF may be detected without executing explicit operation."

9.7.15 Efficient Recovery of Backhaul Link Failure

"Information related to the backhaul failure, which includes a list of nodes that cannot function as a parent node due to the backhaul failure may be provided to a downstream IAB node." (Option 4)

"Preparation of an alternative backhaul link and route in advance (in other words, before occurrence of RLF)" (Option 5)

2.1. IAB Node Stops Service (Option 1)

In Option 1, BH RLF information is implicitly propagated to the child IAB node and the UE, and thus, Option 1 may be regarded as a general solution for the common problem in sections 9.7.14 and 9.7.15. In consideration of influence of the BH RLF not only on the child IAB node but also on the UE (that is connected to the parent IAB node facing the BH RLF), it is anticipated that Option 1 depends on an existing RLF and recovery mechanism, and thus it is an important aspect that Option 1 is supported in the Rel-15 UE. In contrast, in other options, the function of Rel-16 shall be required. In order to minimize interruption of the service also in a case of the Rel-15 UE, Option 1 ought to be specified as a baseline solution for the problem of the BH RLF.

Proposition 1: RAN2 ought to agree to Option 1, in other words, the IAB node stops service with the BH RLF, and that Option 1 is also effective for the Rel-15 UE and is a baseline solution.

According to the description of Option 1, the solution ought to facilitate "the child node also determines the BH RLF". Technically, the MT of the child IAB node and the UE ought to declare the RLF when "service" is interrupted. A simple solution is that the parent IAB node with the BH RLF stops transmission of the PSS, the SSS, the MIB, and the SIB1. With this, the radio problem of the child IAB node and the UE is intentionally created.

Proposition 2: RAN2 ought to agree that the IAB node stops transmission of the PSS, the SSS, the MIB, and the SIB1 when stopping of "service" is determined.

When the agreement to Proposition 2 can be made, it is ought to be precisely defined when the signals are stopped. It can be roughly understood from TR that it is in BH RLF; however, what the BH RLF is and when "service" stops are unclear. Clearly, the BH RLF may be regarded as an RLF between the MT of the IAB node and the DU of the IAB donor (for example, the DU of the parent IAB node). It may be understood in totally the same manner as in the case where the existing RLF between the UE and the gNB is used. Thus, the BH RLF is modeled as the RLF in the radio backhaul link.

Proposition 3: RAN2 ought to agree reuse of the existing RLF mechanism for the BH RLF.

When the agreement to Proposition 3 can be made, even after the current UE operation declares the RLF, in other words, RRC connection is maintained for starting RRC reestablishment, and thus whether or not service actually needs to be stopped in the RLF is unsure. When the UE normally reestablishes RRC connection, the service recovers with minimum interruption time. Thus, it can be understood that, when the MT enters RRC IDLE, in other words, only when RRC reestablishment fails, the IAB node ought to stop "service".

Proposition 4: RAN2 ought to agree that the DU of the IAB node stops "service" when the MT enters RRC IDLE, not when the MT declares the RLF.

As described above, Option 1 is a basis for covering every type of case and device including the Rel-15 UE, and does not represent the best solution in terms of prompt recovery of service and the like. Thus, other options are beneficial in addition to Option 1, and have many other functions specified in the WI.

Observation 1: Other options above Option 1 are still beneficial in further enhancing service quality.

2.2. IAB Node Reports to Downstream Node (Option 2, Option 4)

In order to facilitate the child IAB node promptly and/or efficiently starting the recovery procedure, it is helpful that the parent IAB node reports information related to the BH RLF to the child IAB node. TR captures a possible information element such as "the child IAB node is explicitly warned about an upstream RLF" (Option 2), or information "related to the backhaul failure including a list of nodes that cannot function as a parent node" (Option 4).

Note that, when the BH RLF occurs in the parent IAB node, a method of providing the child IAB node with such information is unclear. The research item concludes "RAN-3 recommends Architecture 1a in a future normative phase". This indicates that the IAB node includes the DU and the MT, and the IAB donor includes (the DU and) the CU. The CU takes charge of the RRC between the DU and the CU, and the BH RLF is detected in the RRC of the MT. Thus, there are two different RRCs that ought to be taken into consideration. The RRC on the MT of the parent IAB node detects the BH RLF, and different RRC of the IAB donor generates an RRC message to be transmitted to the child IAB node.

In consideration of disconnection of a physical radio link due to the BH RLF, information to the downstream node cannot be transmitted using the RRC message. In other words, the RRC message generated by the CU cannot reach the DU due to the BH RLF. "Warning" (of Option 2) may be transmitted using the MAC CE or the like, but when the RRC message is not used, "list of nodes" (of Option 4) is excessively large and flexible. Thus, when Option 2 and/or Option 4 is introduced, RAN2 ought to examine which signaling is used first.

Observation 2: The physical radio link to the CU is disconnected, and thus the DU of the IAB node need not use the RRC message.

It is obvious that the information is provided as the function of Rel-16. In other words, it may be supported only between the IAB nodes. In other words, it is not supported in the Rel-15 UE.

Observation 3: Option 2 and Option 4 function only in the recovery procedure of the Rel-16 IAB node.

2.3. All IAB Nodes Periodically Share Information (Option 3)

In Option 3, the IAB node can detect the BH RLF, based on shared information. The information captured in TR is, for example, "BH quality". This may be existing GNB-DU status indication of F1, or may be new signaling between the DUs.

Observation 4: Option 3 may be out of the range of RAN2.

2.4. Advance Preparation of Alternative Link (Option 5)

Option 5 may aim to use, for example, multi-connectivity (with MN/SN role change), conditioned handover, other technology related to normal topology adaptation or mobility enhancement. As TR states "additional function/enhanced function defined as a part of the WI of other Rel-16 may be utilized", Option 5 may reuse results discussed in the WI or other topics of other WI.

Observation 5: Option 5 may reuse a solution discussed in the WI or other topics of other WI.

Supplementary Note 4

1. Introduction

A new work item of integrated access and backhaul is approved in RAN #82, and low latency scheduling of a multi-hop radio backhaul is considered to be identified.

Specification of IAB Node Following Architecture 1 a

Hop-by-hop propagation of signaling for supporting low latency scheduling, BH RLF processing, and resource adjustment in the entire multi-hop topology.

In the Contribution, a solution to the low latency scheduling will be discussed.

2. Discussion

Figure 22:
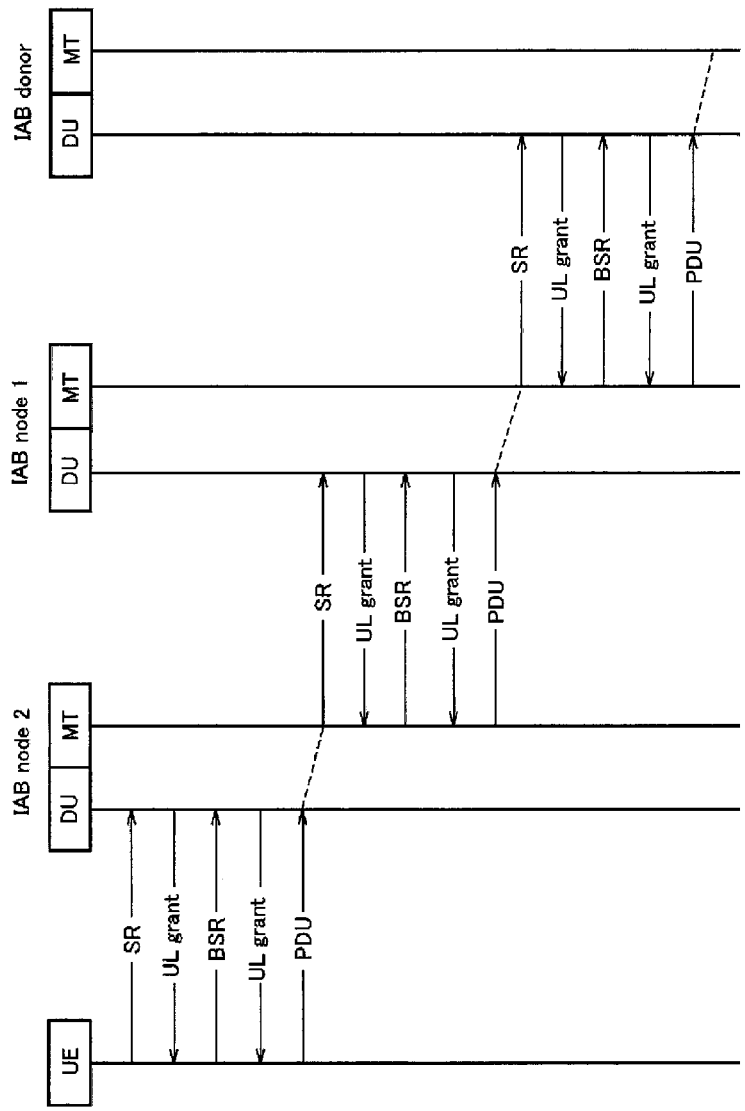
FIG. 22 is a diagram according to a supplementary note.

The research item identifies the problem of latency in UL scheduling due to a sequence procedure of the multi-hop backhaul as illustrated in FIG. 22 captured in section 8.6 of TR 38.87.

TR further identifies conceivable mechanisms, such as "One approach for reducing such delay is configured by starting an uplink resource request with the IAB node, based on data that is expected to arrive. With this, the IAB node can acquire uplink resources before receiving actual data from the child IAB node or the UE to which it provides service." and "The details of the SR/BSR and UL scheduling and the details of the trigger are left for the WI phase."

Prior to giving details, because the solutions slightly differ depending on preconditions, whether enhancement is required for dynamic allocation, is required for a configured grant, or is required for the both ought to be made clear. The description of TR described above may intend to use dynamic resource allocation, the problem of latency may not be a problem for the configured grant, and depending on the case, there is a problem in spectral efficiency. Thus, RAN2 ought to enhance the SR, the BSR, and/or the UL scheduling for the dynamic resource allocation.

Proposition 1: RAN2 ought to enhance the SR, the BSR, and/or the UL scheduling for the dynamic resource allocation in the multi-hop radio backhaul.

In the current specification, the SR is triggered when there are no normal resources for BSR transmission as follows.

MAC Entity

1> When it is determined that at least one BSR is triggered in a buffer status report procedure and is not canceled 2> When a regular BSR is triggered, and logicalChannelSR-DelayTimer is not executed 3> When there are no UL-SCH resources available for new transmission, or 3> When the MAC entity is configured with the configured uplink grant and the regular BSR is triggered for a logical channel for which logicalChannelSR-Mask is configured to be false, or 3> When the UL-SCH resources available for new transmission do not satisfy the restriction (see 5.4.3.1) of LCP mapping configured for the logical channel that has triggered the BSR, 4> The scheduling request is triggered Thus, one of important problems is a method of increasing the speed of triggering the regular BSR. The regular BSR is triggered when data becomes transmittable as follows.

The MAC entity determines the amount of UL data available in the logical channel according to a data amount calculation procedure of TS 38.322 and 38.323.

The BSR is triggered when any of the following events occurs.

The UL data of the logical channel belonging to an LCG becomes available in the MAC entity.

The UL data belongs to a logical channel that has priority higher than the priority of a logical channel including available UL data belonging to any LCG. Alternatively, In the logical channel belonging to the LCG, available UL data is not included.

In this case, the BSR is referred to as a "regular BSR".

To enable "early regular BSR trigger", configuring an additional rule to transmittable data is simple. At present, the calculation procedure of the data amount as described above is performed only in the RLC and PDCP layers; however, the MAC entity of the MT of the backhaul link ought to take the UL data amount indicated in the DU into consideration in some way.

Proposition 2: RAN2 ought to agree that the MAC entity of the MT needs to take the UL data amount visible in the DU of the same IAB node into consideration.

When the agreement to Proposition 2 can be made, which of the data amounts visible in the DU is regarded as transmission capable of using data ought to be studied. The following options are considered.

Option 1: Actual data amount in a buffer in the MAC, the RLC, and the PDCP of a DU protocol stack (and the adaptation layer, depending on the case).

Figure 23:
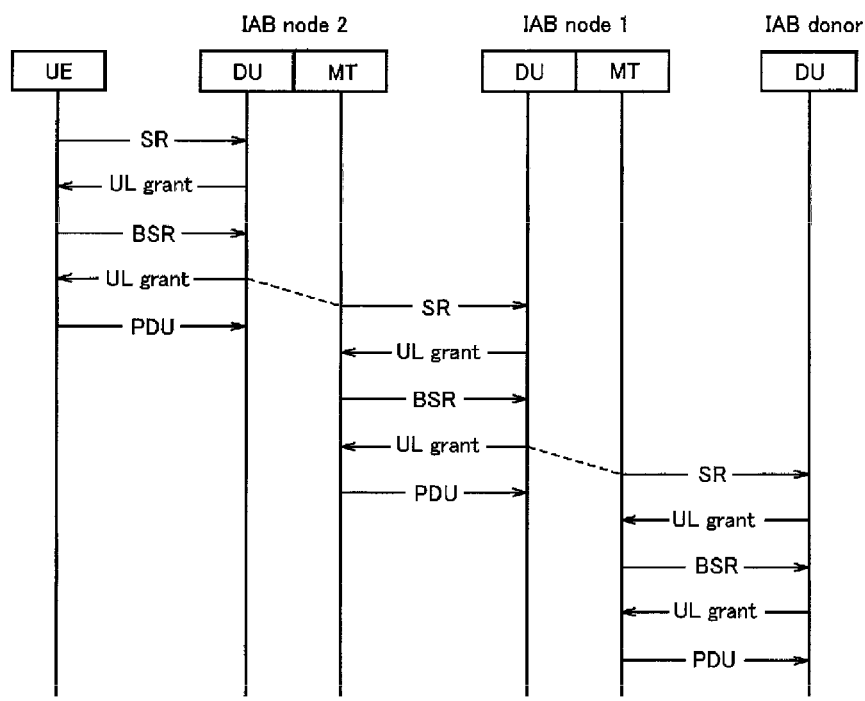
FIG. 23 is a diagram according to a supplementary note.

Option 2: In addition to Option 1, data amount already granted to the child node/UE (FIG. 23).

Option 3: In addition to Option 2, data available for transmission of the child node/UE, in other words, a buffer size of the BSR from the child node/UE (FIG. 21).

From the viewpoint of latency reduction, Option 3 is an optimal solution, because when the DU of the IAB node receives UL data from the child node/UE, it can be expected that the MT of the IAB node grants resources in the backhaul link. In contrast, unless reception of the UL grant in the MT and reception of the UL data in the DU are sufficiently synchronized, a waste of resources may occur. In other words, over scheduling may occur. Option 1 has a low risk, but also has a low benefit. Option 2 is regarded as a balanced solution between among other options.

Proposition 3: RAN2 ought to discuss whether additional data available for transmission is a data amount related to the UL grant to the UE or the BSR from the UE.

The invention claimed is:

1. A communication control method using a relay apparatus configured to relay uplink data transmitted from user equipment to a donor base station in a mobile communication system, the communication control method comprising:
   receiving, by the relay apparatus, a first scheduling request of requesting allocation of an uplink radio resource to a lower apparatus from the lower apparatus;
   after the relay apparatus receiving the first scheduling request from the lower apparatus, allocating, by the relay apparatus, the uplink radio resource to the lower apparatus, and
   after the relay apparatus allocating the uplink radio resource to the lower apparatus, transmitting, by the relay apparatus, a second scheduling request of requesting allocation of uplink radio resource to the relay apparatus to an upper apparatus before receiving the uplink data from the lower apparatus, wherein
   the lower apparatus is the user equipment, or a lower relay apparatus being interposed between the user equipment and the relay apparatus, and
   the upper apparatus is the donor base station, or an upper relay apparatus being interposed between the donor base station and the relay apparatus.

2. The communication control method according to claim 1, further comprising
   allocating, by the relay apparatus, the uplink radio resource used for transmission of a buffer status report to the lower apparatus, in response to reception of the first scheduling request, wherein
   the second scheduling request is transmitted after the relay apparatus allocates the uplink radio resource to the lower apparatus.

3. A relay apparatus configured to relay uplink data transmitted from user equipment to a donor base station in a mobile communication system, the relay apparatus comprising a processor and a memory coupled to the processor, the processor configured to:
   receive a first scheduling request of requesting allocation of an uplink radio resource to a lower apparatus from the lower apparatus;
   after receiving the first scheduling request from the lower apparatus, allocate, the uplink radio resource to the lower apparatus; and
   after allocating the uplink radio resource to the lower apparatus, transmit a second scheduling request of requesting allocation of uplink radio resource to the relay apparatus to an upper apparatus before receiving the uplink data from the lower apparatus, wherein
   the lower apparatus is the user equipment, or a lower relay apparatus being interposed between the user equipment and the relay apparatus, and
   the upper apparatus is the donor base station, or an upper relay apparatus being interposed between the donor base station and the relay apparatus.

4. A chipset for a relay apparatus configured to relay uplink data transmitted from user equipment to a donor base station in a mobile communication system, the chipset comprising a processor and a memory coupled to the processor, the processor configured to:
   receive a first scheduling request of requesting allocation of an uplink radio resource to a lower apparatus from the lower apparatus;
   after receiving the first scheduling request from the lower apparatus, allocate, the uplink radio resource to the lower apparatus; and
   after allocating uplink radio resource to the lower apparatus, transmit a second scheduling request of requesting allocation of uplink radio resource to the relay apparatus to an upper apparatus before receiving the uplink data from the lower apparatus, wherein
   the lower apparatus is the user equipment, or a lower relay apparatus being interposed between the user equipment and the relay apparatus, and
   the upper apparatus is the donor base station, or an upper relay apparatus being interposed between the donor base station and the relay apparatus.

5. A non-transitory computer-readable medium comprising, stored thereupon, computer program instructions for execution by a relay apparatus configured to relay uplink data transmitted from user equipment to a donor base station in a mobile communication system, the computer program instructions being configured to cause the relay apparatus to execute processing of:
   receiving a first scheduling request of requesting allocation of an uplink radio resource to a lower apparatus from the lower apparatus;
   after receiving the first scheduling request from the lower apparatus, allocating the uplink radio resource to the lower apparatus; and
   after allocating the uplink radio resource to the lower apparatus, transmitting a second scheduling request of requesting allocation of uplink radio resource to the relay apparatus to an upper apparatus before receiving the uplink data from the lower apparatus, wherein
   the lower apparatus is the user equipment, or a lower relay apparatus being interposed between the user equipment and the relay apparatus, and
   the upper apparatus is the donor base station, or an upper relay apparatus being interposed between the donor base station and the relay apparatus.

6. A mobile communication system comprising:
   a relay apparatus configured to relay uplink data transmitted from user equipment to a donor base station, wherein
   the relay apparatus is configured to:
   receive a first scheduling request of requesting allocation of an uplink radio resource to a lower apparatus from the lower apparatus;
   after receiving the first scheduling request from the lower apparatus, allocate the uplink radio resource to the lower apparatus, and
   after the relay apparatus allocating the uplink radio resource to the lower apparatus, transmit, a second scheduling request of requesting allocation of uplink radio resource to the relay apparatus to an upper apparatus before receiving the uplink data from the lower apparatus, wherein the lower apparatus is the user equipment, or a lower relay apparatus being interposed between the user equipment and the relay apparatus, and
   the upper apparatus is the donor base station, or an upper relay apparatus being interposed between the donor base station and the relay apparatus.

* * * * *